United States Patent
Wright et al.

(10) Patent No.: US 11,868,745 B2
(45) Date of Patent: *Jan. 9, 2024

(54) SYSTEM AND METHOD FOR COMPILING HIGH-LEVEL LANGUAGE CODE INTO A SCRIPT EXECUTABLE ON A BLOCKCHAIN PLATFORM

(71) Applicant: nChain Licensing AG, Zug (CH)

(72) Inventors: Craig Steven Wright, London (GB); Stephane Savanah, London (GB)

(73) Assignee: nChain Licensing AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,445

(22) Filed: Aug. 13, 2022

(65) Prior Publication Data
US 2023/0057419 A1    Feb. 23, 2023

Related U.S. Application Data

(63) Continuation of application No. 16/629,295, filed as application No. PCT/IB2018/054971 on Jul. 5, 2018, now Pat. No. 11,416,226.

(30) Foreign Application Priority Data

Jul. 7, 2017    (GB) .................................. 1710967.9
Jul. 7, 2017    (GB) .................................. 1710971.1
(Continued)

(51) Int. Cl.
*G06F 8/41*    (2018.01)
*H04L 9/06*    (2006.01)
(Continued)

(52) U.S. Cl.
CPC ................ *G06F 8/433* (2013.01); *G06F 8/31* (2013.01); *G06F 8/41* (2013.01); *G06F 8/443* (2013.01);
(Continued)

(58) Field of Classification Search
None
See application file for complete search history.

(56) References Cited

U.S. PATENT DOCUMENTS 5,761,652 A    6/1998    Wu et al.
6,760,905 B1   7/2004    Hostetter et al.
(Continued)

FOREIGN PATENT DOCUMENTS

CN    106598549 A    4/2017
CN    106598579 A    4/2017
(Continued)

OTHER PUBLICATIONS

Willis et al., "TX Script—History," GitHub, Jun. 27, 2016, https://github.com/Kefkius/txsc/commits/master/doc/txscript.asciidoc, 2 pages.
(Continued)

*Primary Examiner* — Qing Chen
(74) *Attorney, Agent, or Firm* — Davis Wright Tremaine LLP

(57) ABSTRACT

Techniques are presented to enable or facilitate the execution of a portion of source code, written in a high-level language (HLL), on a blockchain platform. The technique comprises receiving a portion of source code as input; and generating an output script comprising a plurality of op_codes. The op_codes are a subset of op_codes that are native to a functionally-restricted, blockchain scripting language. The outputted script is arranged and/or generated such that, when executed, the script provides, at least in part, the functionality specified in the source code. The blockchain scripting language is restricted such that it does not natively support complex control-flow constructs or recursion via jump-based loops or other recursive programming constructs.

17 Claims, 5 Drawing Sheets

(30) Foreign Application Priority Data

| | | | |
|---|---|---|---|
| Jul. 7, 2017 | (GB) | | 1710974.5 |
| Jul. 7, 2017 | (WO) | | PCT/IB2017/054110 |
| Jul. 7, 2017 | (WO) | | PCT/IB2017/054113 |
| Jul. 7, 2017 | (WO) | | PCT/IB2017/054114 |

(51) Int. Cl.
```
G06F 8/30        (2018.01)
H04L 9/32        (2006.01)
G06F 8/51        (2018.01)
H04L 9/00        (2022.01)
```
(52) U.S. Cl.
CPC .............. *G06F 8/452* (2013.01); *G06F 8/51* (2013.01); *H04L 9/0618* (2013.01); *H04L 9/0637* (2013.01); *H04L 9/0643* (2013.01); *H04L 9/3247* (2013.01); *H04L 9/3297* (2013.01); *H04L 9/50* (2022.05); *H04L 2209/56* (2013.01)

(56) References Cited

U.S. PATENT DOCUMENTS

| | | | |
|---|---|---|---|
| 9,569,206 | B1 | 2/2017 | Dawson et al. |
| 10,050,779 | B2 | 8/2018 | Alness et al. |
| 10,871,948 | B1 | 12/2020 | Dowling |
| 2003/0005404 | A1 | 1/2003 | Bowyer et al. |
| 2004/0015916 | A1 | 1/2004 | Click et al. |
| 2014/0068576 | A1 | 3/2014 | Pendap et al. |
| 2015/0007167 | A1 | 1/2015 | Mody et al. |
| 2015/0074655 | A1 | 3/2015 | de Lima Ottoni et al. |
| 2015/0149978 | A1 | 5/2015 | Kim |
| 2016/0274998 | A1 | 9/2016 | Coyle et al. |
| 2016/0330034 | A1 | 11/2016 | Back et al. |
| 2017/0287090 | A1 | 10/2017 | Hunn et al. |
| 2017/0300403 | A1 | 10/2017 | Ramraz |
| 2017/0300627 | A1 | 10/2017 | Giordano et al. |
| 2018/0293157 | A1 | 10/2018 | Dougherty et al. |
| 2018/0314938 | A1 | 11/2018 | Andoni et al. |
| 2019/0116024 | A1 | 4/2019 | Wright et al. |

FOREIGN PATENT DOCUMENTS

| | | |
|---|---|---|
| JP | 361182138 A | 8/1986 |
| JP | 2006107339 A | 4/2006 |
| WO | 2017024071 A1 | 2/2017 |
| WO | 2017027407 A1 | 2/2017 |
| WO | 2017145006 A1 | 8/2017 |
| WO | 2017187398 A1 | 11/2017 |

OTHER PUBLICATIONS

Willis et al., "TX Script," GitHub, Jun. 27, 2016, https://github.com/Kefkius/txsc, 3 pages.
Zyskind, "Efficient secure computation enabled by blockchain technology," Doctoral dissertation, Massachusetts Institute of Technology, Jun. 2016, https://pdfs.semanticscholar.org/5b54/7a7f2e47af79429d9467701538434d8e6bcb.pdf, 128 pages.
Allison, "Jeff Garzik's Bloq runs smart contracts like an 'Ethereum plug-in for Bitcoin,'" International Business Times, May 25, 2016, https://www.ibtimes.co.uk/jeff-garziks-bloq-runs-smart-contracts-like-ethereum-plug-bitcoin-1561976, 5 pages.
Anonymous: "Announcing Ivy Playground—Chain," May 18, 2017, 15 pages.
Anonymous: "Part 1: Transaction Basics Crypto Tokens," Jun. 6, 2017, https:/web.archive.org/web/2017060202729/https://klmoney.wordspress.com/bitcoin-dissecting-transactions-part1, 16 pages.
Anonymous: "Part 2: Building a Transaction by Hand, Crypto Tokens," Jun. 7, 2017, 18 pages.
Antonopoulos, "Mastering Bitcoin—Unlocking Digital Cryptocurrencies," O'Reilly Media, Inc., Dec. 20, 2014, 282 pages.
Bedford, "How to code with Google Blockly," Tech Advisor, Jun. 12, 2014, https://web.archive.org/web/20170626164055/https://www.techadvisor.co.uk/how-to/software/how-code-with-google-blockly-3524675, 6 pages.
Bhargavan et al., "Formal Verification of Smart Contracts," Proceedings of the 2016 ACM Workshop on Programming Languages and Analysis for Security, Oct. 24, 2016, https://antoine.delignat-lavaud.fr/doc/plas16.pdf, 6 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Ceejep et al., "Rfp-8: Higher Level Language Compiling to Transaction Script," Dec. 14, 2015, https://forum.decred.org/threads/rfp-8-higher-level-language-compiling-totransaction-script.3665/, 7 pages.
Chain, "Announcing Ivy Playground," Medium, May 17, 2017, https://web.archive.org/web/20170518000630/https://blog.chain.com/announcing-ivy-playground-395364675d0a, 12 pages.
Chen et al., "Under-Optimized Smart Contracts Devour Your Money," IEEE 24th International Conference on Software Analysis, Evolution and Reengineering (SANER), Feb. 20, 2017, https://arxiv.org/pdf/1703.03994.pdf, 5 pages.
Costill, "Bitcoin Scripting and How It Can Be Improved," Due, https://due.com/blog/bitcoin-scripting-and-how-it-can-be-improved/, Mar. 25, 2016, 16 pages.
Curiosity Driven, "Bitcoin contracts compiler," Sep. 6, 2014, https://github.com/curiosity-driven/bitcoin-contracts-compiler, 2 pages.
Curiosity Driven, "Bitcoin contracts," Apr. 8, 2016, https://curiosity-driven.org/bitcoin-contracts, 10 pages.
Curiosity Driven, "Superscript compiler," Sep. 6, 2014, https://github.com/curiosity-driven/bitcoin-contracts-compiler/commits/master, 1 page.
De Rosa, "A developer-oriented series about Bitcoin—Section 10: The Bitcoin Script language (pt. 1) and Section 11: The Bitcoin Script language (pt. 2)," May 25, 2015, https://davidederosa.com/basic-blockchain-programming/, 17 pages.
Etherscan, "ByteCode to Opcode Disassembler," Etherscan, the Ethereum Block Explorer, Aug. 2015, https://etherscan.io/address/0xafdacfee6395bc1e480a900943f1803f854bc20e, 3 pages.
Etherscan, "Contract Address—Transaction Example," Etherscan, the Etheruem Block Explorer, Oct. 20, 2016, 3 pages.
Etherscan, "Contract Address," Etherscan, the Etheruem Block Explorer, copyright 2017, https://etherscan.io/address/0x5a4964bb5fdd3ce646bb6aa020704f7d4db79302, 4 pages.
Exab et al., "Understanding the risk of BU (bitcoin unlimited)," Reddit, Feb. 22, 20217, https://www.reddit.com/r/Bitcoin/comments/5vo5wi/understanding_the_risk_of_bu_bitcoin_unlimited/, 27 pages.
FMLFPL111 et al., "It's there a solution to the scaling problem?," Reddit, Jan. 25, 2017, https://www.reddit.com/r/Monero/comments/5q3fcf/its_there_a_solution_to_the_scaling_problem/, 14 pages.
Frontier, "State Machine," Gitbooks, Mar. 15, 2017, https://ethereum.gitbooks.io/frontierguide/content/opcodes,_costs,_and_gas.html, 1 page.
Gitbook, "Ethereum Frontier Guide," Gitbook (Legacy), Feb. 4, 2016, 293 pages.
International Search Report and Written Opinion dated Aug. 30, 2018, Patent Application No. PCT/IB2018/054970, 13 pages.
International Search Report and Written Opinion dated Aug. 30, 2018, Patent Application No. PCT/IB2018/054971, 12 pages.
International Search Report and Written Opinion dated Mar. 23, 2018, Patent Application No. PCT/IB2017/054110, 13 pages.
International Search Report and Written Opinion dated Mar. 23, 2018, Patent Application No. PCT/IB2017/054113, 13 pages.
International Search Report and Written Opinion dated Mar. 23, 2018, Patent Application No. PCT/IB2017/054114, 14 pages.
International Search Report and Written Opinion dated Sep. 3, 2018, Patent Application No. PCT/IB2018/054969, 13 pages.
Klmoney, "Part 1: Transaction Basics," Jun. 6, 2017, Wordpress, https://web.archive.org/web/20170606202729/https://klmoney.wordpress.com/bitcoin-dissecting-transactions-part-1/, 9 pages.
Klmoney, "Part 2: Building a Transaction by Hand," Wordpress, Jun. 7, 2017, https://web.archive.org/web/20170607015517/https://klmoney.wordpress.com/bitcoin-dissecting-transactions-part-2-building-a-transaction-by-hand/, 21 pages.

(56) References Cited

OTHER PUBLICATIONS

Kosba et al., "Hawk: The Blockchain Model of Cryptography and Privacy-Preserving Smart Contracts," IEEE Symposium on Security and Privacy, May 22, 2016, 31 pages.
Le Calvez, "A look at Bitcoin non-standard outputs," Medium, Nov. 8, 2015 [retrieved Feb. 28, 2017], https://medium.com/@alcio/a-look-at-bitcoin-non-standard-outputs-c97f65cccbb6#.3fw5ur52k, 6 pages.
Lerner, "RSK Rootstock Platform Bitcoin powered Smart Contracts White Paper version 9," Nov. 19, 2015, https://uploads.strikinglycdn.com/files/90847694-70f0-4668-ba7fdd0c6b0b00a1/RootstockWhitePaperv9-Overview.pdf, 24 pages.
Morgenstern, "Forth's Stacks," Forth.org, Nov. 14, 2016, https://web.archive.org/web/20161114030625/http://www.forth.org/svfig/Len/softstak.htm, 3 pages.
Nakamoto, "Bitcoin: A Peer-to-Peer Electronic Cash System," Bitcoin, Oct. 31, 2008, https://bitcoin.org/bitcoin.pdf, 9 pages.
Rensylvain et al., "Any truth to haveing turing complete programming worked into bitcoin via an OP code?," Reddit, Dec. 13, 2015, https://www.reddit.com/r/Bitcoin/comments/3wpkd0/any_truth_to_haveing_turing_complete_programming/, 14 pages.
Rios et al., "Derivative-free optimization: a review of algorithms and comparison of software implementations," Journal of Global Optimization 56(3):1247-93, Jul. 12, 2012.
Robinson, "Ivy: A Declarative Predicate Language for Smart Contracts," Chain, https://cyber.stanford.edu/sites/default/files/danrobinson.pdf, Jan. 2017, 30 pages.
Sarchar et al., "[Announce] Whitepaper for Bitstorage—a peer to peer, cloud storage network," Bitcoin Forum, Nov. 27, 2013, https://bitcointalk.org/index.php?topic=348868.0, 10 pages.
Satoshi et al., "Connection Limits," Bitcoin Forum, Aug. 9, 2010, https://bitcointalk.org/index.php?topic=741.0; prev_next=prev, 2 pages.
Solidity in Depth, "Expressions and Control Structures" Input Parameters and Output Parameters, Jul. 3, 2017, https://docs.huihoo.com/ethereum/solidity/control-structures.html, 10 pages.
Stevenroose et al., "IRC Chat Log 2016-02-09," Bitcoin Wizards, Feb. 9, 2016, https://irclog.whitequark.org/bitcoin-wizards/2016-02-09, pages.
Tekknolagi et al., "How to implement LOOP in a FORTH-like language interpreter written in C," Stack Overflow, Aug. 4, 2011, https://web.archive.org/web/20150531001644/https://stackoverflow.com/questions/6949434/how-to-implement-loop-in-a-forth-like-language-interpreter-written-in-c, 4 pages.
UK Commercial Search Report dated Nov. 17, 2017, Patent Application No. GB1710974.5, 9 pages.
UK IPO Search Report dated Dec. 21, 2017, Patent Application No. GB1710967.9, 9 pages.
UK IPO Search Report dated Dec. 21, 2017, Patent Application No. GB1710971.1, 9 pages.
UK IPO Search Report dated Dec. 21, 2017, Patent Application No. GB1710974.5, 9 pages.
Wikipedia, "Proof of space," Wikipedia the Free Encyclopedia, Jul. 11, 2017, https://en.wikipedia.org/w/index.php?title=Proof-of-space&oldid=790069182, 5 pages.
Willis et al., "TX Script—Documentation," GitHub, Jun. 27, 2016, https://github.com/Kefkius/txsc/blob/master/doc/txscript.asciidoc, 8 pages.
github.com, "EVM Opcode Gas Costs", https://github.com/djrtwo/evm-opcode-gas-costs, Apr. 12, 2017, 2 pages.
Robinson, Dan, "Ivy: A Declarative Predicate Language for Smart Contracts" BPASE 2017, Stanford University, Jan. 26, 2017, 6 pages.

Figure 2

The Population of the Try[] array.

/* Populate the Try[] array with the values provided. Replicate the block of code 12 times (as there are potentially up to 12 inputs OP_1 27 OP_PICK OP_GREATERTHANOREQUAL
OP_IF
    OP_TOALTSTACK
    OP_TOALTSTACK
    OP_TOALTSTACK
    ...
    OP_DROP
    OP_2 OP_PICK
    OP_FROMALTSTACK
    OP_FROMALTSTACK
    OP_FROMALTSTACK
    ...
OP_ENDIF OP_2 27 OP_PICK OP_GREATERTHANOREQUAL
OP_IF
    OP_TOALTSTACK
    OP_TOALTSTACK
    OP_TOALTSTACK
    ...
    OP_DROP
    OP_4 OP_PICK
    OP_FROMALTSTACK
    OP_FROMALTSTACK
    OP_FROMALTSTACK
    ...
OP_ENDIF

......

/* the above block is replicated 12 times, incrementing the 'index' each time and adding 2 to the depth for OP_PICK each time. In our example, at execution time, only the first five blocks will pass the initial test so only five OP_PICKs will be executed to populate the first 5 elements of Try[]

SYSTEM AND METHOD FOR COMPILING HIGH-LEVEL LANGUAGE CODE INTO A SCRIPT EXECUTABLE ON A BLOCKCHAIN PLATFORM

CROSS REFERENCE TO RELATED APPLICATIONS

This application is a continuation of U.S. patent application Ser. No. 16/629,295, filed Jan. 7, 2020, entitled "SYSTEM AND METHOD FOR COMPILING HIGH-LEVEL LANGUAGE CODE INTO A SCRIPT EXECUTABLE ON A BLOCKCHAIN PLATFORM," which is a 371 National Stage of International Patent Application No. PCT/IB2018/054971, filed Jul. 5, 2018, which claims priority to United Kingdom Patent Application No. 1710967.9, filed Jul. 7, 2017, United Kingdom Patent Application No. 1710971.1, filed Jul. 7, 2017, United Kingdom Patent Application No. 1710974.5, filed Jul. 7, 2017, International Patent Application No. PCT/IB2017/054110, filed Jul. 7, 2017, International Patent Application No. PCT/IB2017/054113, filed Jul. 7, 2017, and International Patent Application No. PCT/IB2017/054114, filed Jul. 7, 2017, the disclosures of which are incorporated herein by reference in their entirety.

The present disclosure relates generally to distributed ledger technologies, and more particularly to blockchain technologies such as, for example, the Bitcoin network and associated protocol. It also relates to compilers and compiler-related technologies for the translation of computer-based code. One or more embodiments of the invention are suited for use as a solution to enable and/or facilitate the automation and execution of high-level programs on a blockchain platform or protocol which comprises a functionally-restricted script-based language.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions.

Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language called Script. The scripts are written using commands (op_codes) which are converted into executable code by the interpreter.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE and possibly other checks pass, the transaction can be deemed valid and the transaction can be mined for inclusion in the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing, etc.) while being more versatile in their applications. Thus, there is a need for wider adoption of the technology for new applications and technical innovations, similar to the adoption of the internet in its early days and the subsequent boom in development of web-based systems.

However, writing programs in scripting languages such as, for example, is not as intuitive or readily adoptable by the wider programming community because it requires knowledge and skill relating to low-level programming techniques. It requires the programmer to consider the stack(s) and locations of data within them. Writing programs made up of low level op_codes is more time and labour intensive than writing source code in a high-level language (HLL) such as C, Java etc. Compilers/interpreters built for such HLLs provide a convenient layer of abstraction which distances the programmer from the more laborious, lower-level issues relating to memory management etc. Writing sequences of op_codes to manipulate data in one or more stacks is more technically complex and time-consuming than writing source code in an HLL. Therefore, errors and bugs are more likely to occur because of the difficult nature using low-level op_codes.

Moreover, HLLs enable the programmer to include complex control flow structures such as loops, case statements and recursive calls in their source code. The programmer can focus on the desired logic and express logical flows in an intuitive manner with mechanisms such as "while this is true, do X . . . ". However, some blockchain-associated scripting languages such as Bitcoin's Script, are functionally restricted in the sense that while they include classic operators such as arithmetic operations and also cryptographic functions such as hashing operators and signature verification, they do not include native primitives for complex control structures such as while loops, or allow the use of recursive techniques, as one would be able to use in an HLL. Such a restricted language would not support jump-based control flow. Thus, by design, they restrict the language and logical constructs offered to the programmer for inclusion in the source code. This has led some people to contend that restricted languages such as Script are non-Turing complete, although this definition is contested by others. Therefore, we will use the phrase "functionally restricted".

It is noted, though that while this deliberate restriction may make the coding process more difficult for the programmer, it results in program execution time is bounded and, importantly, provides a significant security mechanism because it prevents malicious exploits e.g. protects against the use of infinite loops to implement Denial of Service (DoS) attacks.

Therefore, there is a trade-off between crucial security and the need to facilitate, encourage and improve the development of blockchain-based technologies. In order to address the latter problem, Ethereum incorporates a HLL language as a native feature in its blockchain platform. As with Script, a lower-level interpreter is required to produce the executable version of the code. Ethereum's HLL language, known as Ether, allows control-flow to be executed through the use of conditional and unconditional jumps. It also allows recursion. In order to avoid problems such as DoS attacks, Ethereum limits transaction execution time by introducing the concept of gas—a portion of cryptocurrency that is paid in advance to cover execution costs. Thus, an additional layer of technical and commercial complexity is required because of the use of a native HLL. Additionally, Ethereum has suffered from at least one significant, recursion-based attack to date. See, for example the Dao exploit, such as available at: hackingdistributed.com/2016/06/18/analysis-of-the-dao-exploit/

Thus, it is desirable to provide a mechanism by which programmers can develop, design and produce valid blockchain solutions in an easier, quicker and more efficient manner, using HLL languages that they are familiar with, but without compromising the security provided by functionally-restricted scripting languages. This is by no means a trivial task, which requires a significant degree of technical innovation. It is, among others, one of the technical problems addressed by the present disclosure.

Thus, in accordance with the present disclosure, there is provided a system(s) and corresponding method(s) as defined in the appended claims.

In accordance with the present disclosure there may be provided a computer-implemented method and corresponding system(s). The method may be arranged to enable or facilitate the execution of a portion of source code on a blockchain platform. The source code may be written in a high level language. The present disclosure describes a compilation technique and system/component, which may be implemented as a software compiler. It may be referred to hereafter as a "blockchain or Bitcoin compiler". The software compiler may be arranged for use in conjunction with the Bitcoin blockchain or any other blockchain-based protocol/network.

Advantageously, the software compiler of the present disclosure may enable a user (programmer) to write and create blockchain-executable programs/applications in a language which is familiar to them, e.g., in a C, Java, C++ style of syntax. This opens up the task of blockchain-based development to a wider development community. It also means that blockchain-based solutions can be written more swiftly and can be error-checked by the invention as discussed in more detail below. Crucially, the security features of the underlying protocol and associated scripting language are preserved and maintained. Thus, the invention provides techniques and systems for preserving blockchain-related security during process of script generation, and facilitates or enables the generation of valid, error free scripts (and thus transactions) which validated by nodes on a blockchain network.

In accordance with one possible embodiment, a computer-implemented method may be provided that uses static compilation to translate a portion of source code into a blockchain-compatible script. This may be referred to as an "output script" as it may form the output provided by the compiler. The invention may test for one or more errors. It may provide an alert if one or more errors is detected. The static compilation may comprise the step of loop unrolling; one or more loops provided within the portion of source code may be unrolled. It is noted that the terms "static compilation" and "loop unrolling" are terms known in the art and as they are readily understood by a person skilled in the art.

The method may be arranged for use with a blockchain network. The blockchain network may be associated with a protocol. It may be a "proof-of-work" blockchain. It may be a consensus-based blockchain. It may be a public and/or un-permissioned blockchain. It may be a peer-to-peer, decentralised blockchain.

The blockchain network may which comprise a plurality of nodes that validate blockchain transactions. The blockchain transactions may include scripts that can be executed by the plurality of nodes. The scripts may be represented by, or comprise, a set of op_codes belonging to a functionally-restricted (or otherwise referred to as a non-Turing complete") blockchain scripting language. The method may comprise the step of generating the output script for incorporation into a blockchain transaction validated by the nodes of the blockchain network. The output script may be represented by the set of op_codes belonging to the functionally-restricted blockchain scripting language, and the output script may be arranged or adapted such that execution of the script by the nodes of the blockchain network performs the functionality specified in the source code.

The portion of source code may be written in a high level language (HLL). The HLL may be described as a compilable HLL. The HLL may be compiled by a software component (compiler) arranged in accordance with the present invention. The HLL may be compiled by the compiler to produce a script which can be executed by an interpreter. The script may be provided in a blockchain transaction (Tx). It may be associated with an input or output of the transaction. The HLL may be a Turing complete language (subject to real world constraints) in that it may permit expressions, constructs and/or statements which implement complex control flows such as recursion, complex selection structures and/or loops. The syntax native to the HLL may include loop-related syntax such as WHILE, FOR or REPEAT loops. It may comprise primitives for the performance of cryptographic, arithmetic and stack-manipulation operations. The HLL may comprise customised Op_codes and/or high level language constructs, substantially as described below.

The blockchain compatible script may be a script (i.e., program) which is formed of op_codes that are selected from, are native to, and/or form part of a blockchain scripting language which can be executed on a blockchain. The op_codes may be referred to as primitives or commands. The script may be passed through an interpreter or Virtual Machine before being executed/executable on the blockchain. (The term "blockchain" in this context may include the protocol and implementing platform). The interpreter may translate the script into machine-executable (object) code. The blockchain scripting language may be, for example, the Script language as used in conjunction with the Bitcoin protocol or a variation thereof. The scripting language may be arranged for use with a blockchain protocol. The scripting language may comprise cryptographic, arithmetic and stack-manipulation op_codes.

The blockchain scripting language may be functionally restricted. It may be restricted in respect of the functionality that syntax/interpreter are arranged to permit or handle. It may not natively support complex control flows such as recursion, complex selection structures and/or loops.

Additionally or alternatively, a method can be provided that is arranged to enable or facilitate the execution of a portion of source code, written in a high-level language (HLL), on a blockchain platform. The source code may be arranged to implement a smart contract. The smart contract may be a machine readable and executable application, executable on a blockchain as known in the art.

The method may comprise the step of receiving the portion of source code as input. It may be received by a software-implemented compiler.

The method may comprise the step of generating an output script. This may be a blockchain-compatible script as described above. It may comprise a plurality of op_codes selected from and/or native to a functionally-restricted, blockchain scripting language. This scripting language may be as described above. When executed, the script may provide, at least in part, the functionality specified in the source code.

The method may comprise the step of providing or using a compiler arranged to perform any embodiment of the method(s) described above. The output script may be generated by performing a static compilation.

The use of static compilation provides the advantage that the resulting script will always halt. Not only does this provide practical advantages at run-time, it enables the invention to serve as a validation tool because the blockchain compiler will stop if some type of error or invalid construct is encountered in the source code. The advantage of being able to use a validation tool during script development means that the programming task is enhanced by reducing programmer time and effort. Further still, the blockchain compiler provides a security solution in that it tests for bugs and overflow errors, enabling the user (programmer) to statically test whether the program will execute and execute safely.

The blockchain scripting language may be restricted such that it does not natively support complex control-flow constructs or recursion via jump-based loops or other recursive programming constructs. The step of generating the output script may comprise unrolling at least one looping construct provided in the source code. The method may comprise the step of providing or using an interpreter or virtual machine arranged to convert the output script into a form that is executable on a blockchain platform.

The method may further comprise the step of optimising the output script at least once to provide a more efficient or reduced version of the output script. This may involve the use of derivative free optimisation (DFO). DFO is a term known in the art and readily understood by a person skilled in the art. Additionally or alternatively, the step of generating the output script may comprise the use of derivative free optimisation.

The blockchain compiler may be arranged to form part of, and/or operate in conjunction with, a software development kit (SDK). The SDK may comprise an editor, a debugger and other component(s) known to be used with an SDK to facilitate the generation of code-based solutions.

The HLL may comprise at least one primitive, operator or construct which can be translated directly into one or more primitives/commands/op_codes native to the blockchain scripting language.

The blockchain scripting language may be stack-based. It may be arranged to manipulate one or a plurality of stacks. The HLL may comprise one or more primitives or operators arranged to cause the performance of an operation on a stack used by the scripting language.

The HLL may comprise a primitive or construct arranged to push a number of inputs to the source code onto a stack used for memory allocation by the blockchain scripting language. The HLL may comprise one or more primitives arranged to cause the execution of cryptographic operation or function, and arithmetic operation, and/or a loop.

The HLL may comprise at least one of the following primitives or operators or their respective functional equivalent:

Initiate;
Declare;
Increment;
IF;
While;
Populate;
Monus;
Reset;
Rawscript;
Abort;
Retrieve
Hash, hash 160, or another hash operation or a variation thereof.

The present disclosure may provide a method comprising the step of using static compilation to translate a portion of source code into a blockchain-compatible script. The static compilation may comprise the step of loop unrolling.

The portion of source code may include at least one high level programming construct. The output script may be generated by translating the high level programming construct into one or more op_codes belonging to the functionally-restricted blockchain scripting language. The one or more op_codes of the output script may be arranged or adapted such that execution of the one or more op_codes by the nodes of the blockchain network performs the (functionality of) at least one high level programming construct of the source code.

Preferably, the functionally-restricted blockchain scripting language does not support loop constructs. Preferably, the at least one high level programming construct comprises a loop construct. Preferably, the script is generated by unrolling the loop construct (which may also be referred to as a "looping construct"). Preferably, the loop construct includes a block of code and an argument specifying a number of iterations, and unrolling the loop construct involves writing op_codes for functionality of the block of code for the number of iterations.

The method may further comprise the step of checking syntax of the loop construct to ensure that the loop construct includes an argument specifying a number of iterations and that such argument satisfies a constraint specifying a maximum number of iterations.

The loop construct may include a block of code and a condition for specifying a number of iterations of the loop construct based on at least one variable. Preferably, unrolling the loop construct involves replicating op_codes for the functionality of the block of code in conjunction with writing op-codes commands that selectively execute the replicated op_codes for the functionality of the block of code for a maximum number of iterations based on evaluation of the condition using a value of the variable determined from execution of the output script.

In accordance with the present disclosure, there is provided a computer-implemented system arranged to implement the steps of any embodiment of the method(s) described herein.

A computer-implemented system in accordance with an embodiment of the present disclosure may comprise a compiler. The compiler may be arranged to receive a portion of source code as input. The source code may be written in a high-level language (HLL). The compiler may be arranged to generate an output script. The output script may be referred to as a "blockchain script" or "blockchain compatible script" and may comprise a plurality of op_codes. These op_codes may be selected from, and/or native to, a functionally-restricted, blockchain scripting language as described above such that, when executed, the script provides, at least in part, the functionality specified in the source code.

The system may comprise a software development kit (SDK). The compiler may form part of the DSK.

The invention also provides a system, comprising:
a processor; and
memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

Any feature(s) described above in relation to one aspect or embodiment of the present disclosure may also apply to one or more other aspects or embodiments. Any feature described in relation to a method of the present disclosure may apply equally to a system in accordance with the present disclosure, or vice versa.

These and other aspects of the present disclosure will be apparent from and elucidated with reference to, the embodiment described herein. An embodiment of the present disclosure will now be described, by way of example only, and with reference to the accompany drawings, in which:

FIG. 1 illustrates an overview of the present invention.

FIG. 2 provides the block of code for the populating the Try[ ] array as discussed in relation to the example below for unrolling a while loop.

OVERVIEW

Hereafter, we may refer to the Bitcoin protocol, blockchain, network or scripting language for ease of reference only, as it is the most widely known and adopted. However, the invention is not limited for use with Bitcoin-related blockchains, and other blockchain technologies fall within the scope of the present disclosure.

As discussed above, the majority of programmers today write code in High Level Languages such as C, C++ Java etc., rather than at low level. Writing code at the lower level takes more time, requires more specialised knowledge of memory manipulation, and errors can be introduced as a result. Therefore, it would be advantageous for programmers to be able to write valid, tested and error-checked code for blockchain applications in a language which is more familiar to them, without compromising the security provided by the underlying, restricted scripting language.

The methods and systems as described in the present disclosure enable the development of an 'SDK' for the creation of specialised blockchain transactions or clusters of transactions. For example, the transactions may be intended to automatically enforce the terms and conditions of machine executable smart contracts, although many other applications are possible and the invention is not limited in this regard. Thus, the invention may form part of "toolkit" or system for creating and testing blockchain-related technologies.

Advantageously, the blockchain compiler performs static compilation of the user's source code, and enables the implementation of complex control flow mechanisms via the use of techniques such as loop unrolling. As known in the art, "loop unrolling" may also be referred to as "loop unwinding". Loop unrolling is a loop transformation technique which can be used by compilers to reduce the frequency of branches in certain types of loops, and/or to reduce loop maintenance instructions. By unrolling loops found in the source code, the compiler can produce a translated version of the source code which is executable on a blockchain platform which uses a functionally restricted scripted language.

Figure 1:
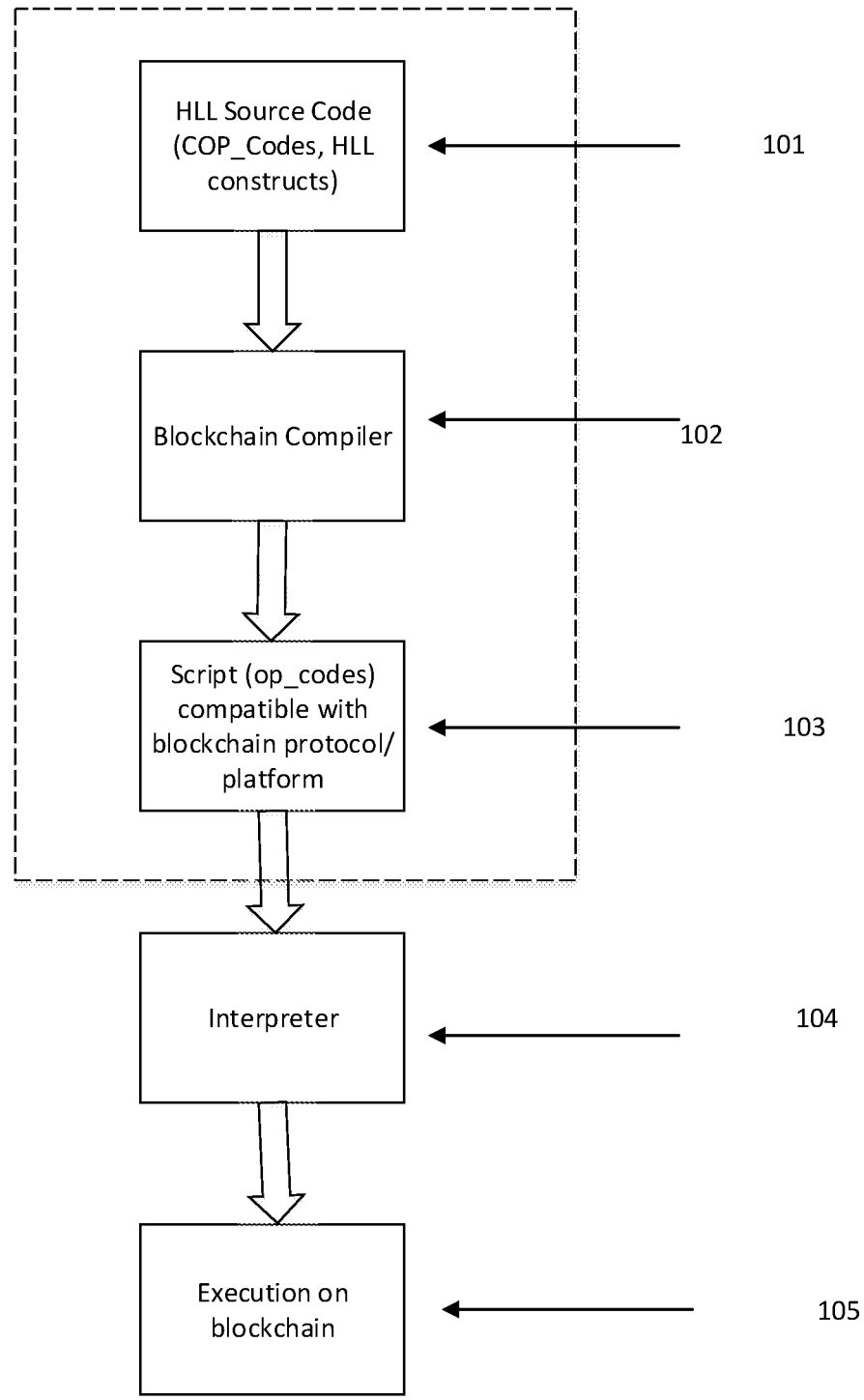

Turning to FIG. 1, an embodiment of the present disclosure enables the user (programmer) to use a high level language (HLL) to define the code 101 for the desired application e.g. smart contracts and then execute a blockchain compiler 102 which compiles the HLL code 101 into executables. These executables may be in the form of chunks of 3G languages programs (such as python, C++, etc.) that can be executed by bots, or they might be in the form of chunks of (e.g. Bitcoin) script 103. The latter is achieved by designing and generating chunks of script that can perform specific functions. For example, the original version of Bitcoin script included a function for multiplication called OP_MUL. This op_code is currently disabled. However, the same functionality can be recreated by using the existing, enabled op_codes in a small portion of script.

Embodiments of the present disclosure may comprise one or both of two types of primitive:
Customised op_codes (which we will refer to hereafter as COP_CODEs); and
High level Language (HLL) constructs HLL constructs require a compiler 102 to translate them into script code 103, while COP_CODEs require only a direct substitution from the COP_CODE to the block of OP_CODEs. Typically, a primitive is made into a COP_CODE if it does not require access to any variables—that is, if it can be completely described using only OP_CODEs which already exist in the blockchain scripting language for a given protocol (and other COP_CODEs) and hard-coded inputs.

For example, the monus primitive can be fully described with op_codes and so can be made into a COP_CODE, as follows:

```
OP_SUB
OP_0
OP_MAX
```

However, the execution of a WHILE loop depends on required variables (for example, the condition for execution; a counter for the number of iterations; etc.). Therefore, WHILE is not suitable to be made into a COP_CODE and would be written as a HLL construct.

Advantageously, the incorporation of two types of primitive provides additional flexibility for the programmer. Programmers that will be writing programs directly into Bitcoin script (i.e. not using a HLL) will be able to use enhanced script functionality by way of the COP_CODEs. In effect, these give the script programmer a substitution for the block of OP_CODEs that will perform the function they need, cutting down on programming time and effort. All that is needed is a 'COP-CODE compiler' which simply substitutes the COP_CODE with the block of OP_CODEs that constitute it. Programmers unable or unwilling to write programs in the low level bitcoin script are able to use the HLL supported by the present disclosure instead.

The Customised OP_Codes (COP_Codes) are further discussed below.

1. Customised OP_CODEs (COP_CODEs)

This section describes the standards that may be applied hereafter and in accordance with the present disclosure in relation to script primitives for Customised OP_CODEs (COP_CODEs). COP_CODEs are given similar format to the regular op_codes and operate in the same way. That is, writers of Script (and/or compilers) use primitives in the same way as one would conventionally use op_codes. A list of Bitcoin op_codes can be found at the Bitcoin wiki: https://en.bitcoin.it/wiki/Script.

Naming Conventions

Script primitives are named herein analogously to Bitcoin Script op_codes, as follows:

COP_xxx

Where 'xxx' is a shorthand for the function. For example, a multiplication function might be named: COP_MULT. Also analogously to op_codes, if a function has specific number of parameters or a specific number used in a calculation, the name may incorporate that number.

For example, the op_code 'OP_2DROP' means 'Removes the top two stack items' while 'OP_1ADD' means '1 is added to the input'. Therefore, COP_2MULT might mean specifically 'The input is multiplied by 2'.

Validation Prior to Execution

In cases where a specific number of inputs or format of inputs is expected, the primitive performs a check prior to executing the functional logic, and aborts (marks the transaction as invalid) if the inputs do not match expectations. Advantageously, this prevents functions from executing and providing an output that might be incorrect or misleading. For example, if a particular primitive is intended to operate only on inputs that are positive numbers but nevertheless will execute without error on negative numbers then the result might be a 'valid transaction' but with an unexpected or incorrect result.

2. High Level Language (HLL) Constructs

These are functions or statements that a compiler ranged in accordance with the present disclosure is able to recognise and be able translate into Bitcoin script. Taken all together these constitute a high level programming language using syntax familiar to programmers. As well as the familiar constructs (such as IF-ELSE; CASE; WHILE loops; etc.) there are also unfamiliar constructs very specific to the HLL because of the way bitcoin transactions work. For example, an INITIATE construct performs a very specific function which is to ensure the number of data inputs automatically pushed to the main stack is saved as the first constant in the memory allocation (assigned to reserved word NUM_INPUTS). In embodiments, the INITIATE construct can be the first statement in a HLL program and the DECLARE construct (which performs the memory allocation for constants and variables) can be the second statement in the HLL program.

A HLL construct must be designed in such a way that it can be translated into Bitcoin script (i.e., into OP_CODEs and COP_CODEs) by a compiler using only the information available at compilation time. That usually means a lot of hard-coding by the programmer, in which constants are DECLARE'd and assigned values in the program. For example, even though NUM_INPUTS is considered a constant a compiler will not have access to its value until the program executes, so this cannot be used for compilation execution (although of course the programmer can use it like any other constant in the program).

When designing a HLL construct, the designer can include the expected operations of the compiler in pseudo-code or a clear explanation in natural language. For example, the compiler might be required to perform certain checks—such as correct syntax and verifying compliance with any constraints (such as size limitations). This should be explicit even though the specific constraints may not be known yet. The task of designing HLL constructs does not include writing the compiler itself but must ensure that all the expected operations of the compiler will be possible.

A selection of HLL constructs which may be used in accordance with an illustrative embodiment of the present disclosure is now provided.

HLL Construct: While Loop

Description

A block of code (or code-block, which is typically referred to as the loop body) will be repeatedly executed as long as a specified condition remains True, up to a maximum number of iterations. The maximum number of iterations must be known and specified at compile time. The loop is emulated by the technique known as 'unrolling the loop'. This means that a sequence of op_codes that represent the functionality (sequence of operations) of the code-block is replicated to the specified maximum number of iterations. An IF statement prior to each replicated sequence of op_codes for the code-block determines if the sequence of op_codes for the code-block gets executed. The IF condition is checked at the start of the loop (i.e. before first execution of the sequence of op_codes for the code block).

Syntax:

```
WHILE (Iterations, Condition)
    <CODE-BLOCK>
END_WHILE
```

Where:
Iterations:
   A positive integer
   the maximum number of times the Code-Block could be executed. The compiler needs to know this value because it will generate the Code-Block up to this many times. It could be hard-coded, or it could refer to a constant that is in the DECLARE statement.

Condition:
An evaluable expression that resolves into TRUE or FALSE
May be a compound condition—i.e. using AND, OR, etc. (whichever is currently recognised by the compiler)

Compiler Operations:
Perform syntax checking.
Check that Iterations satisfies any constraints (e.g. falls within a prescribed range)
Check that the expression(s) in Condition is evaluable:
All constants/variables in the expression exist in the memory allocation (DECLARE) list
Check that all operators used in the expression are currently allowed (=, <, >, etc.)
Check that compound expressions satisfies any constraints (e.g. limited ANDs, ORs, etc.)
Replicate the functionality of the Code-Block 'Iterations' times:
Start of Replicated Code
Write one or more op_codes that the resolve the Condition (i.e. whose execution leaves TRUE or FALSE on top of the stack):
The general process can employ a RETRIEVE construct that fetches each value required for the test and places the value on top of the main stack; then perform the relevant test operation (i.e. OP_EQUAL; OP_LESSTHAN; OP_GREATERTHAN; etc.). If a value to be tested is a constant then it will be in a known location in the allocated memory (i.e., a known position on the main stack) and will be copied to the top of the stack using OP_PICK. If the value to be tested is a variable (in this case, the value to be tested is determined during script execution), then the location of the variable will be in a known location in the allocated memory (i.e., a known position on the alt stack) and can be copied to the top of the main stack using a 'Borrow Block' method.
If the test employs a compound condition (using AND, OR, etc.), each subcondition will be separately evaluated and the end-result (0 or 1) left on top of the main stack. These will then be combined to test the compound condition. For example, if the compound condition is of the form 'Exp1 OR Exp2': the operations first evaluate Exp1 then evaluate Exp2 then write OP_BOOLOR which will compare the top two values on the stack (i.e. the evaluation results for Exp1 and Exp2).
The result of the evaluation is left on top of the main stack. No other values are on the stack (except of course for the allocated memory). The value will be consumed by the next operation (OP_IF).
Translate the functionality (sequence of operations) of the Code-Block into a sequence of op_codes that represent the functionality of the Code-Block. Such translation can be bypassed for any COP_CODE included in the Code-Block, which requires only a direct substitution of the COP_CODE into the sequence of op_codes for the Code-Block. Then write the sequence of op_codes that represent the functionality of the Code-Block within an OP_IF/OP_ENDIF pair
End of Replicated Code In some embodiments, the sequence of op_codes that represent the replicated Code-Block can be configured such that the initial stack positions for constants and variables that are accessed by the sequence of op_codes for each iteration of the WHILE Loop construct is constant over the loop iterations. Note that the value(s) of the variable(s) can be updated over the loop iterations; however, the stack positions for such constants and variables when beginning execution of each loop iteration will remain constant over the loop iterations. Such operations ensure that the replicated sequence of op_codes access the appropriate constants and/or variables stored on the stacks during each loop iteration.

In some embodiments, the Condition for replicating the Code-Block can be dependent on the value of one or more variables which are determined during script execution and thus can be updated over the loop iterations. In this case, each iteration of the replicated Code-Block can include one or more op_code commands that test the relevant Condition followed by the sequence of op_codes that represent the replicated Code-Block embedded within an OP_IF/OP_ENDIF pair. In this configuration, during execution of the script, the op_code commands that test the relevant Condition will evaluate as TRUE or FALSE and place the TRUE or FALSE result on top of the stack. The execution of the following OP_IF statement will selectively execute the replicated Code-Block only when the TRUE result is on top of the stack. Thus, when the FALSE result is on top of the stack, the execution of OP_IF statement bypasses the execution of the replicated Code-Block.

Furthermore, the Condition for replicating the Code-Block can be bounded by a maximum number of iterations, which can be defined by a parameter specified in the WHILE Loop construct, a parameter fixed by system design or some other parameter. In this case, the op-code commands that test the Condition and the following sequence of op_codes that represent the replicated Code-Block embedded within the OP_IF/OP_ENDIF pair can be replicated a number of times corresponding to the parameter-defined maximum number of iterations.

Also note that the HLL program can employ nested WHILE Loop constructs where an inner WHILE Loop construct is contained within the Code-Block of an outer WHILE Loop construct. In this case, the compiler can perform loop unrolling for the inner WHILE Loop construct in conjunction with loop unrolling for the outer WHILE Loop construct. For example, the loop unrolling of the inner WHILE Loop construct can replicate a sequence of op_codes that represents the functionality of the Code-Block of the inner WHILE Loop construct between a pair of OP_IF/OP_ENDIF bytecode instructions for a number of iterations of the inner WHILE Loop construct. Furthermore, the loop unrolling of the outer WHILE Loop construct can replicate a sequence of op_codes that represents the functionality of the Code-Block of the outer WHILE Loop construct between a pair of OP_IF/OP_ENDIF bytecode instructions for a number of iterations of the outer WHILE Loop construct. In this case, the sequence of op_codes that represents the functionality of the Code-Block for each iteration of the outer WHILE Loop construct will include the op_code sequences for the number of iterations of the inner WHILE Loop construct.

Also note that the WHILE Loop nesting can be extended where an additional inner WHILE Loop construct is contained within the Code-Block of the inner (first inner) WHILE Loop construct and with possible further nesting. In this case, the loop unrolling operations as described herein can be readily extended to address this further nesting.

HLL Construct: INITIATE
Description:
In embodiments, this is the mandatory first statement of any HLL program.

The first part of a script execution as supplied by the transaction spender (i.e., the 'scriptsig') is outside the control of the unlocking script. It usually consists of data that will be pushed to the stack. The purpose of the INITIATE construct is to enable the programmer to manage this input (whether or not it is required for the rest of the script, as is most likely).

This construct 'allocates a value' to the reserved word NUM_INPUTS (being the number of items in the spender-provided input that gets pushed to the stack). The first OP_CODE will always be OP_DEPTH so that the top of the stack (at this point) contains the number of data inputs that were pushed to the stack. This position in the stack will be fixed and known to the compiler at compilation time, although the actual value will not be known at compilation time.

Syntax:
INITIATE
Compiler Operations:
Write OP_DEPTH/*this sets OP_DEPTH to the value of NUM_INPUTS
HLL Construct: DECLARE
Description:
In embodiments, the is the mandatory second construct of any HLL program.

Declare all constants and variables so the compiler can reserve 'memory storage' (i.e. positions in the main and/or alt stacks). The standard is to keep constants on the main stack and variables on the alt stack. The compiler will associate the names given to the variables and constants to their positions on the stack. The compiler will push the named items onto the main stack, which already contains the data input provided by the spender (see INITIATE) and on top of that a value representing the number of those data items (which it associates to the reserved word NUM_INPUTS).

Syntax:

```
DECLARE
   CONSTANTS             = Initial-value
      Const-name            Initial value (if same for all elements)
      Array-nameA[array-size] =
      Array-nameB[1]        = initial value for element 1
      Array-nameB[2]        = initial value for element 2
      ...
      Array-nameB[n]        = initial value for element n
   VARIABLES
      Var-name              = Initial-value
      Array-nameC [array-size] = Initial value (if same for all elements)
      Array-nameD[1]        = initial value for element 1
      Array-nameD[2]        = initial value for element 2
      ...
      Array-nameD[n]        = initial value for element n
END_DECLARE
```

Compiler Operations:
Write PUSHDATA commands to put the DECLARE'd constant values of the HLL program into memory storage (such as the main stack). The commands can begin at the top and push the items into the memory storage one by one. The compiler can keep track of the location (e.g., main stack position) of each constant value in the memory storage.

Write OP-TOALTSTACK commands to put variables of the HLL program into the memory storage (such as the alt stack). Again, the compiler can keep track of the location (e.g., alt stack position) of each variable in the memory storage.

Example:

```
DECLARE
   CONSTANTS
      Stock [5]    = 0      /* Array of 12 values all initialised to 0
      Stock_Needed = 3      /* hard-coded per rules
      NUM_Hashes   = 4      /* hard-coded per rules
                            /* array of 10 hash values hardcoded:
      HASH_SAVED[1] = 20-byte hash value
      HASH_SAVED[2] = 20-byte hash value
      HASH_SAVED[3] = 20-byte hash value
      HASH_SAVED[4] = 20-byte hash value
   VARIABLES
      Stockcounter                          = 0
      Trycounter                            = 0
      HashCounter                           = 0
      MatchFound                            = FALSE
```

Following the compiler execution of these statements (and assuming the mandatory INITIATE statement will pick up some values) the state of the memory storage (in this case, main stack and alt stack) will be something like this:

| | | | |
|---|---|---|---|
| (for temp variables) | | | |
| HASH_SAVED[4] | (20 byte hash) | | |
| HASH_SAVED[3] | (20 byte hash) | | |
| HASH_SAVED[2] | (20 byte hash) | | |
| HASH_SAVED[1] | (20 byte hash) | | |
| Num_Hashes | 4 | | |
| Stock_Needed | 3 | | |
| Stock[5] | 0 | | |
| Stock[4] | 0 | | |
| Stock[3] | 0 | | |
| Stock[2] | 0 | | |
| Stock[1] | 0 | | |
| NUM_INPUTS | n | | |
| INPUTn | 0 | | Match_Found |
| ... | | 0 | Hash_counter |
| INPUT2 | | 0 | Try_counter |
| INPUT1 | | 0 | Stock_counter |
| Stack | | Alt | |
| (Constants) | | (Variables) | |

In this example we assume there will be some number of input items supplied to the unlocking script. At the very least, there will be a value in the position labelled 'NUM_INPUTS' (this is a reserved word) even if that value is 0 and there are no values on the stack below it. This value will be considered as the start of the memory block, irrespective of how many items are below it. The compiler knows the number of items in memory and their initial relative position from the top of the stack. These items will remain in position for the duration of the program execution. Temporary calculations are done using the space on top of the stack (shown in the diagram as '(for temp variables)'). When items are temporarily pushed onto the top of the main stack for calculations, this changes the relative position of the memory items. However, the compiler will always retain knowledge of the relative position.

For example, after the DECLARE statement is executed the compiler will compute and internally retain the value for the Init-depth (in our example Init-depth=12) and the depth position for each item in the stack. i.e.:

Init-Depth-Num_Hashes=5

Init-Depth-NUM_INPUTS=12

Init-Depth-Stock[$i$]=11−$i$+1

The compiler will be able to calculate the depth of any item at any point during the compilation based on the <item's initial depth>+<number of items added onto the stack>.

HLL Construct: INCREMENT

Description:

A variable will be retrieved from its location in memory; incremented by 1; and then replaced in its location in memory.

Syntax:

INCREMENT (Variable-name)

Where:

Variable-name:

The name used in the Declaration section to identify the variable.

Compiler Operations:

Note: the compiler maintains knowledge of the varying number of items on both stacks (say: Main_Stack_Height and ALT_Stack_Height). The compiler also knows the positions of each variable and constant on each stack, which is established during the Declaration section. i.e. Var-Posn=the position of Variable-name in the alt stack (i.e. the number of items up from the bottom of the stack).

The operation uses the Borrow Block technique.

---

Calculate Var-Depth = ALT_Stack_Height - Var-Posn + 1
Write OP_FROMALTSTACK Var-depth times  /* get the required variable to top of main stack
Write OP_ADDI  /* increment the value by 1
Write OP_TOALTSTACK Var-depth times  /* Replace all borrowed variables back to alt stack
(see example 2 in the Borrow Block description).

---

Example: Increment Variable B

---

|        |       |
|--------|-------|
|        | F     |
|        | E     |
|        | D     |
|        | C     |
| Const2 | B     |
| Const1 | A     |
| MAIN   | ALT   |

---

The task is to increment variable B. The compiler knows that the depth of B in the alt stack is: B-Depth=5. The compiler generates the following script code:

---

OP_FROMALTSTACK  /* Move top of alt to main stack
5 times (i.e. B_Depth times)
OP_FROMALTSTACK
OP_FROMALTSTACK
OP_FROMALTSTACK
OP_FROMALTSTACK
B
C
D
E
F Const2
Const1    A
MAIN      ALT
OP_ADD1          /* Increment the value on top of the main stack by 1
B+1
C
D
E
F
Const2
Const1    A
MAIN      ALT
TO-ALTSTACK      /* Return variables to the alt stack
TO-ALTSTACK      /* i.e. perform TO_ALTSTACK B-Depth times
TO-ALTSTACK
TO-ALTSTACK
TO-ALTSTACK
          F
          E
          D
          C
Const2    B+1
Const1    A
MAIN      ALT

---

HLL Construct: IF ELSE

Description:

Standard IF Test

Syntax:

---

IF Value1 test-operation Value2
    TRUE-CODE-BLOCK
ELSE
    FALSE-CODE-BLOCK
END_IF

---

Where:

Value1 a hardcoded value or a variable name or constant name

Value2 a hardcoded value or a variable name or constant name

Test-operation a mathematical test operator such as '='; '<'; '>'; '≤'; '≥' (etc.)

Compiler Operations:

Check the syntax. Including:

---

Match test-operation to equivalent OP CODE (internal table):
    = OP_EQUAL
    > OP_GREATERTHAN
    < OP_LESSTHAN
    (etc.)
If Value1 is a variable or constant:
    Write RETRIEVE Value1  /* leaves Value1 on top of stack
Else (it's a number)
    Push Value1 top of stack -continued

```
If Value2 is a variable or constant:
    Write RETRIEVE Value2   /* leaves Value2 on top of stack
Else (it's a number)
    Push Value2 top of stack
Write:
OP_IF
    TRUE-CODE-BLOCK    /* code-block to execute if the test results in
TRUE
OP_ELSE
    FALSE-CODE-BLOCK   /* code-block to execute if the test results in
FALSE
OP_ENDIF
```

HLL Construct: RESET
Description:
A variable will be assigned a specified value.
Syntax:
RESET (Variable-name, Reset-value)
Where:
    Variable-name The name of the variable to be assigned a new value
    Reset-value The value to be assigned to Variable-name
Compiler Operations:
    Note: the compiler maintains knowledge of the varying number of items on both stacks (say: Main_Stack_Height and ALT_Stack_Height). The compiler also knows the positions of each variable and constant in the allocated memory (i.e. on each stack), which is established during the DECLARE section.
    Assume Var-Posn=the position of Variable-name in the alt stack (i.e. the number of items up from the bottom of the stack). The operation uses the Borrow Block technique:

```
Calculate Var-Depth = <current ALT_Stack_Height> - Var-Posn + 1
Write OP_FROMALTSTACK Var-depth times /* Get the required variable to top of
main stack
Write OP_DROP Reset-value        /* Delete previous value; replace with
required value
Write OP_TOALTSTACK Var-depth times   /* Replace all borrowed variables back to
alt stack
```

HLL Construct: ABORT
Description:
Mark the transaction as invalid
Syntax:
ABORT
Compiler Operations:
Write OP_0 OP_VERIFY
HLL Construct: POPULATE
Description:
    The purpose of this construct is to populate a constant DECLARE'd by the programmer using input from the transaction spender (such as input supplied by execution of the unlocking script of a spending transaction).
    The input to the locking script (i.e., the 'scriptsig') will push any data onto the main stack. This occurs before the DECLARE construct so these inputs are on the bottom of the stack. The number of stack items (NUM_INPUTS) has been placed on top of them by the (mandatory) INITIATE statement. It is the responsibility of the programmer to verify that the rules of the transaction have been met (e.g. that the right number of inputs have been provided).
Syntax:
POPULATE (Stack-position, Constant-name)
Where:
Stack-position:
    Integer. The position counting downwards from the bottom of the memory block. Remember that the bottom of the memory block always contains the item NUM_INPUTS and below this are the input data that gets pushed onto the stack before the locking script code is executed.
Constant-Name:
    The name of the constant to be populated.
Compiler Operations:
Calculate shift-count=number of stack items to be temporarily moved off the main stack onto the alt stack for safekeeping:
Shift-count=Number of stack items on top of the target item (Constant-name)
Calculate the Input-depth=<relative height of Constant-name>+stack-position
Write:
OP_TOALTSTACK (replicate this Shift-count times)
OP_DROP/*discard current value of Constant-name (was presumably set to 0)
<Input-depth> OP_PICK/*get the value required and place in the Constant-name position
OP_FROMALTSTACK (replicate this shift-count times)
HLL Construct: RAWSCRIPT
Description:
    An array of values representing a valid chunk of bitcoin Script code. The compiler will first validate the array to ensure that it is a valid chunk of script code (including OP_CODEs, COP_CODEs and integers).
    The purpose is to allow a programmer to include low level code directly into the Compiler output. This is useful for any functionality that is still easier to code directly into script code than using the currently available HLL constructs.
Syntax:
RAWSCRIPT [Values]
Where:
    Values An array (list) of OP_CODEs, COP_CODEs and their integer inputs
Compiler Operations:
    The compiler first validates that the set of values together constitutes valid bitcoin script. That is, the OP_CODEs are all part of the currently accepted enabled OP_CODEs, the COP-CODEs all exist in our lexicon of COP_CODEs and they all have the expected input values.
    Next, the Compiler simply writes out the values into the current location in the output script.
HLL Construct: CALCULATE TEMP
Description:
    A valid calculation is done that places the result on top of the main stack. 'Valid' means it is one of the function constructs currently available to the HLL. Programmer must write the program so that TEMP is available (i.e. still on top of stack) when it is referenced later. Note that TEMP can only be referenced once. (If it is needed more than once then it should have been DECLARE'd as a variable instead.)

Syntax:
CALCULATE TEMP=expression
Compiler Operations:
Check that expression is valid (is a member of the list of currently available function constructs).
Execute the expression, leaving the result (TEMP) on top of the stack.
Parse the following reference to TEMP—determine if TEMP will indeed be on the top of the stack at the time of the reference: if not throw a compilation error.
Example:
CALCULATE TEMP=HASH160 (123456789)
HLL Construct: HASH160
Description:
This performs the hashing algorithm equivalent to the OP_CODE: OP_HASH160
Syntax:
HASH160 (value1)
Where:
value1 is either:
A hardcoded integer
A DECLARE'd constant
A DECLARE'd variable
Compiler Operations:
If value1 is a hardcoded number, it is pushed to top of stack
If value1 is a variable or constant, then is RETRIEVED (put onto top of stack)
Compiler writes:
OP_HASH160
HLL Construct: RETRIEVE
Description:
A variable or constant will be retrieved from its location in memory and copied top the top of the main stack. The original value will remain unaltered in its current location in 'memory'.
Syntax:
RETRIEVE (Item-name)
Where:
Item-name a DECLARE'd variable or constant
Compiler Operations:
Note: the compiler maintains knowledge of the varying number of items on both stacks (say: Main_Stack_Height and ALT_Stack_Height). The compiler also knows the positions of each variable and constant on each stack, which is established during the Declaration section. i.e. Item-posn=the position of Item-name in the stack (i.e. the number of items up from the bottom of the stack). The operation uses the Borrow Block technique.

Calculate Item-Depth=Stack_Height−Item-posn+1

Example: Retrieve a Copy of Variable C
We assume that the memory allocation looks like this:

|        |        | F |
|        |        | E |
|        |        | D |
|        |        | C |
| Const2 |        | B |
| Const1 |        | A |
| MAIN   |        | ALT |

The task is to place a copy of the variable C on top of the main stack. The compiler knows that the depth of C in the alt stack is: C-Depth=4. The compiler generates the following script code:

| OP_FROMALTSTACK | /* Move top of alt to main stack 4 times |
| (i.e. C Depth times) | |
| OP_FROMALTSTACK | |
| OP_FROMALTSTACK | |
| OP_FROMALTSTACK | |
| C | |
| D | |
| E | |
| F | |
| Const2    B | |
| Const1    A | |
| MAIN    ALT | |
| OP_DUP | /* Duplicate the value of C to the top of stack |
| C | |
| C | |
| D | |
| E | |
| F | |
| Const2    B | |
| Const1    A | |
| MAIN    ALT | |
| <C_Depth+1> OP ROLL | /* OP ROLL from depth of 5 (i.e. C Depth + 1) |
| <C_Depth + 1> OP ROLL | /* Do this 4 times (i.e. C-Depth times) |
| <C_Depth + 1> OP ROLL | |
| <C_Depth + 1> OP ROLL | |
| C | |
| D | |
| E | |
| F | |
| C | |
| Const2    B | |
| Const1    A | |
| MAIN    ALT | |
| TO-ALT STACK | /* Return borrowed variables to the alt stack |
| TO-ALT STACK | /* i.e. perform TOALTSTACK C-Depth times |
| TO-ALT STACK | |
| TO-ALT STACK | |

---

If the required item is in the alt stack (i.e. it is a variable)
Write OPFROMALTSTACK Item-depth times   /* Get the required variable to top of main stack
Write OP_DUP                            /* Duplicate the value for later use on the main stack
Write the following Item-Depth times:   /* Move the duplicated value to the bottom of the
    <Item-Depth + 1>                    /*   set of borrowed variables.
    OP_ROLL
Write OP_TOALTSTACK Item-depth times    /* Replace all borrowed variables back to alt stack
If the required item is in the main stack (i.e. it is a constant)
Write <Item-Depth> OP_PICK              /* Copy required Constant to top of main stack -continued

```
F
E
D
C        C
Const2   B
Const1   A
MAIN     ALT
         /* The required variable value is retained on top of
         the main stack
```

Reserved Words
Reserved Word: NUM_INPUTS
Description:
This is always the bottom constant of the memory block. I.e. it is the 'first' item in the block of allocated stack positions. Although it is a constant, it is not known at compile time. Therefore it cannot be used by the compiler for any hard-coded script operations (for example, it cannot be used as a number to count how many OP_TOALTSTACK statements to generate in the compiled code). It is known at execution time, so it can be used by the programmer or compiler for tasks such as condition tests in Loops and IF statements.
Reserved Word: TEMP
Description:
This is a temporary once-off variable that after being calculated is left on top of the stack. It exists to enable the programmer to reference it in calculations. The compiler will check the syntax to ensure that TEMP is still on the top of the stack when it is referenced later in the program.
Reserved Word: CONSTANTS
Description:
This is used in conjunction with the DECLARE construct. It is followed by the list of constants that will be pushed onto the main stack.
Reserved Word: VARIABLES
Description:
This is used in conjunction with the DECLARE construct. It is followed by the list of variables that will be pushed onto the alt stack.

For the purposes of illustration, we now provide a use case example involving a WHILE loop, an example HLL program and the Bitcoin script code that would be compiled from it. The Bitcoin script code employs op_codes that belong to the Bitcoin scripting language Script. Note that Bitcoin script code includes comments, which begin with /* or // as is conventional. These comments need not be part of the Bitcoin script code generated by the compiler, but are included below for purposes of explaining the operations of the compiler in generating the exemplary Bitcoin script code.
While Loop Example—Transaction (Tx)
Consider a blockchain transaction (Tx) that has an internal list of 10 hard-coded hash puzzles. To unlock an output of the Tx the spender needs to provide at least 3 correct hash solutions. The transaction locking script will accept up to 12 tries in the same input (i.e. in the 'scriptsig') and they can be in any order. The transaction will hash each input 'try' and check if it matches one of the internally stored hash values.
For clarity, consider the legacy way of describing the unlocking script in the INPUT section of a Bitcoin transaction:
<scriptSig> <scriptPubkey>
The first part <scriptSig> is the data and/or OP_CODEs included in a spending transaction in order to unlock the OUTPUT of a previous transaction being spent. The second part <scriptPubkey> is the locking script used in the OUTPUT of the previous transaction being spent.
We will refer to these as follows:
<Spender Input> <locking script>
Assume that Spender Input is TRY1 TRY2 TRY3 TRY4 TRY5
That is, the spender has tried 5 different possible hash solutions, of which only 3 need to be correct in order to unlock the transaction, as per the rules specified above. When the combined <Spender Input> <locking script> is executed the first operations will be whatever is in <Spender Input>, which in this example is simply pushing the 5 data items onto the stack.

Locking Script Logic - Pseudocode

*Note: There will be nested WHILE loops*

Standard first step: count the number of inputs and save as NUM_INPUTS

Declare variables and constants that will be used in the script and initialise known values:

Constants                          /* These are put in the main stack

Try[12]               = 0        /* Array of 12 values all initialised to 0

Correct_Needed   = 3        /* hard-coded per rules

NUM_Hashes       = 10        /* hard-coded per rules

/* array of 10 hash values hardcoded

HASH_SAVED[1] = 20-byte hash value

HASH_SAVED[2] = 20-byte hash value

...

HASH_SAVED[10]        = 20-byte hash value

Variables                          /* These are put in the alt stack

Correct_counter      = 0          /* count the number of hits (correct matches)

Try_counter           = 0          /* index for the outer loop

Hash_Counter         = 0          /* index for the inner loop

Match_Found           = FALSE    /* Boolean for detecting a hit (matching hashes)

IF NUM_Inputs > 12                            /* Rules state that maximum inputs is 12

Abort                                         /* Abort if spender broke this rule

END-IF

Populate the internal array with the spender's input values (i.e. in this example, assign Try[1] – Try[5] to the input values TRY1 TRY2 TRY3 TRY4 TRY5). The remainder of the array remains with zero values.

/* Outer loop starts here: get each input value (TRY1 – TRY5) and hash it for the check
WHILE (Try_counter < NUM_Inputs AND Correct_counter < Correct_Needed)
    Increment Try_counter
   Reset
       Hash_counter    = 0
       Match_Found    = FALSE
    Calculate Hash (Try[Try_counter])

/* Inner loop starts here: for each saved hash value, check if it matches the hashed Try value
    WHILE (Match_Found = FALSE AND Hash-Counter < NUM_Hashes)
       Increment Hash_counter
       IF Hash (Try[Try_counter]) = HASH-SAVED[Hash_counter]
          Set MATCH_Found = True
          Increment Correct_counter
       END-IF
    END-WHILE END-WHILE
IF Correct_Counter ≥ Correct_Needed
Mark transaction as Valid

Formal HLL program
The following code is written in the HLL using syntax in accordance with an embodiment of the present disclosure. It is intended to illustrate the usage of WHILE but by necessity it also contains other HLL constructs (these are CAPITALISED), some of which are detailed above but will be readily understood by the person skilled in the art as they are familiar constructs used by conventional modern high level languages.

```
INITIATE                                    /* Sets value of NUM_INPUTS
DECLARE                                     /* Allocates memory
    CONSTANTS                               /* These are put in the main stack
        Try[]              = 0              /* Array of 12 values all initialised to 0
        Correct_Needed     = 3              /* hard-coded per rules
        NUM_Hashes         = 10             /* hard-coded per rules
        HASH_SAVED[1]      = 233...23768    /* array of 10 hash values hardcoded
        HASH_SAVED[2]      = 133...23798
        ...
        HASH_SAVED[10]     = 193...03791
    VARIABLES                               /* These are put in the alt stack
        Correct_counter    = 0              /* count the number of hits (correct matches)
        Try_counter        = 0              /* index for the outer loop
        Hash_Counter       = 0              /* index for the inner loop
        Match_Found        = FALSE          /* Boolean for detecting a hit (matching hashes)
END_DECLARE IF NUM_INPUTS > 12                          /* maximum allowed inputs =12 (hard coded)
    ABORT
END_IF
```

/* For each array element, check if there is a corresponding input value available on the stack and if so use it to populate the corresponding array element.

```
IF NUM_INPUTS ≥ 1
        POPULATE (1,Try[1])                /* Read inputs to memory
END_IF
IF NUM_INPUTS ≥ 2
        POPULATE (2,Try[2])
END_IF
IF NUM_INPUTS ≥ 3
        POPULATE (3,Try[3])
END_IF
IF NUM_INPUTS ≥ 4
        POPULATE (4,Try[4])
END_IF
IF NUM_INPUTS ≥ 5
        POPULATE (5,Try[5])
END_IF
IF NUM_INPUTS ≥ 6
        POPULATE (6,Try[6])
END_IF
IF NUM_INPUTS ≥ 7
        POPULATE (7,Try[7])
END_IF
IF NUM_INPUTS ≥ 8
        POPULATE (8,Try[8])
END_IF
IF NUM_INPUTS ≥ 9
        POPULATE (9,Try[9])
END_IF
IF NUM_INPUTS ≥ 10
        POPULATE (10,Try[10])
END_IF
IF NUM_INPUTS ≥ 11
```

POPULATE (11,Try[11])
END_IF
IF NUM_INPUTS ≥ 12
    POPULATE (12,Try[12])
END_IF

/* Outer loop. Note the compound condition
WHILE (12, Try_Counter < NUM_INPUTS AND Correct_counter < Correct_Needed)
    INCREMENT (Try_counter)
    RESET (Hash_Counter, 0)
    RESET (Match_Found, FALSE)
    CALCULATE TEMP = HASH160 (Try(Try_counter))

/* Inner loop. Another compound condition
    WHILE (NUM_HASHES, Match_Found = FALSE AND Hash_counter < NUM_Hashes)
        INCREMENT (Hash_counter)
        IF TEMP = HASH_SAVED[Hash_Counter]
            RESET (Match_found, TRUE)
            INCREMENT (Correct_counter)
        END_IF
    END_WHILE
END_WHILE IF Correct_Counter ≥ Correct Needed
    OP_TRUE                              /* This marks the transaction as valid
END_IF

Compiled Bitcoin Script

/* INITIATE

OP_DEPTH   // Determine NUM_INPUTS (reserved word) and place on top of the stack.

/* DECLARE CONSTANTS. Initialise the constants and put onto main stack. Compiler knows the position of the constants; Array of 12 values (these are the 'try values' – later they will be populated with the actual input values)

In effect an array: Try[12]

OP_0 OP_0 OP_0 OP_0 OP_0 OP_0 OP_0 OP_0 OP_0

OP_3   // Correct_Needed – the num of correct hash hits required to unlock the TX is hardcoded to 3

OP_10 // Num_Hashes – the number of hashes in the array is hardcoded to 10

/* The hardcoded hash values are stored onto the main stack (i.e. push the next 20 bytes onto the stack) In effect an array HASH-SAVED[10].

20 HASH-SAVED1

20 HASH-SAVED2

20 HASH-SAVED3

20 HASH-SAVED4

20 HASH-SAVED5

20 HASH-SAVED6

20 HASH-SAVED7

20 HASH-SAVED8

20 HASH-SAVED9

20 HASH-SAVED10

/* DECLARE VARIABLEs Initialise the variables (indices and Booleans) and put onto Alt stack. Compiler knows positions.

OP_0 OP_TOALTSTACK // Correct_Counter – the number of correct hits (when a hash match is found)

OP_0 OP_TOALTSTACK // Try_counter – index for outer loop: the counter for the input value being tried OP_0 OP_TOALTSTACK // Hash_counter – index for inner loop: the counter for the hash being tried.

OP_0 OP_TOALTSTACK // Match_found – Boolean flag: set to True when a hash match is found /* At this stage the Alt stack has been populated and acts as a memory store for variables. The compiler will need to 'keep track' of the location of the variables – i.e. their 'depth' on the alt stack. The main stack has been populated with constants. The compiler will need to keep track of their locations also. The 'first value' of the Main stack memory block is considered to be the position of NUM_INPUTS (irrespective of how many items are below it).

/* At this stage, the compiler knows that the value for NUM_INPUTS is at a depth of 27 in the main stack. The operations below copy this value to the top of the stack. Then it pushes the value '12' to the top of the stack and compares using '>'. If NUM_INPUTS is > 12 (which corresponds to the maximum 12 'tries' allowed), then it aborts. The operations can use OP_DROP because OP_VERIFY leaves result on top of stack.

27 OP_PICK OP_12 OP_GREATERTHAN OP_VERIFY OP_DROP

/* POPULATE THE Try[] array. NOTE: The block of code for the populating the Try[] array has been moved to Figure 2 to improve clarity and readability of the application. We assume that the compiler writes out a block of script code that will read the input values supplied by the spender of the Tx output and use them to populate the Try[] array. In one example there are only 5 inputs (i.e. 5 'tries') provided, so only the first 5 elements of Try[] will be populated and the other elements will remain with the value 0.

/* Outer WHILE loop. The maximum number of possible iterations is 12 (for example, as per a predefined rule) therefore the compiler will unroll the Outer WHILE loop by replicating the following sequence of op_codes 12 times.

/* Borrow Block for Condition1: 'is Try_counter < NUM_Inputs AND Correct_counter < Correct_Needed?' To do the tests in condition1 we need to extract the variables from the Alt stack; perform the tests and then put the variables back again ('borrow block').

/* First get a copy of Try_counter and place on top of the stack.

OP_FROMALTSTACK
OP_FROMALTSTACK
OP_FROMALTSTACK
OP_DUP
OP_4 OP_ROLL
OP_4 OP_ROLL
OP_4 OP_ROLL
OP_TOALTSTACK
OP_TOALTSTACK
OP_TOALTSTACK

/* Then, get a copy of NUM_Inputs and place on top of the stack; the Compiler knows that this constant is currently at a depth of 14 on the main stack

OP_14 OP_PICK

/* Now do the comparison of the two top stack items for part1 of Condition1; this checks Try-Counter < NUM_Inputs?' and leaves result on top of stack

OP_LESSTHAN

/* Do part2 of Condition1 check ('is Correct_counter < Correct_Needed?'). Leave result on top of stack /* First get a copy of Correct_counter and place on top of the stack.

OP_FROMALTSTACK
OP_FROMALTSTACK
OP_FROMALTSTACK
OP_FROMALTSTACK
OP_DUP
OP_5 OP_ROLL
OP_5 OP_ROLL
OP_5 OP_ROLL
OP_5 OP_ROLL
OP_TOALTSTACK
OP_TOALTSTACK
OP_TOALTSTACK
OP_TOALTSTACK

OP_13 OP_PICK // Copy Correct_Needed to top of stack: Compiler knows that this constant is currently at a depth of 13.

OP_LESSTHAN  // Now do the comparison of the two top stack items for part2 of Condition1; this checks 'Correct_counter < Correct_needed?' and leaves result on top of stack OP_BOOLAND // This completes the condition1 combined check: the results of both parts of the condition1 check are on the top of the stack. After this op the final result of the Condition1 test is on top of the stack. It is popped off by the following IF.

OP_IF

/* Borrow block for Increment of Try-Counter. First step is to get it to top of main stack. The compiler knows its depth on the alt stack (in this case depth = 3). */

OP_FROMALTSTACK
    OP_FROMALTSTACK
    OP_FROMALTSTACK
    OP_ADD1
    OP_TOALTSTACK
    OP_TOALTSTACK
    OP_TOALTSTACK

/* Borrow block for reset Hash_counter = 0. The compiler knows the position of this variable OP_FROMALTSTACK
    OP_FROMALTSTACK
    OP_DROP OP_0
    OP_TOALTSTACK
    OP_TOALTSTACK /* Borrow block for reset Match-Found = FALSE. The compiler knows the position of this variable.

OP_FROMALTSTACK
    OP_DROP OP_FALSE
    OP_TOALTSTACK

/* Copy required 'Try' value to top of stack and hash it
    <Try-depth> OP_PICK
    OP_HASH160   // In the formal HLL this is the value of TEMP, which is left on top of the stack. Further operations will push and pop more values onto/off the main stack. The intention is that when the value of TEMP is next needed (for the equality check) it will be there on top of the stack. The compiler can verify this at compilation time because the compiler can keep track of what is in the stack at all times based on the formal HLL code.

/* Inner WHILE Loop

/* The Inner WHILE Loop is performed for Num_Hashes iterations, which has a maximum value of 10 in the example given. Therefore, the compiler will unroll the Inner WHILE loop by replicating the following sequence of op_codes for Num_Hashes iterations (which is less than or equal to 10 iterations) within each iteration of the Outer WHILE Loop.

/* Borrow Block for Condition2: 'Is Match_Found = FALSE AND Hash-Counter < NUM_Hashes?' To do the tests in condition1 we need to extract the variables from the Alt stack; perform the tests and then put the variables back again ('borrow block').

/* First get a copy of the variable Match_Found for part 1 of Condition 2 and place it on top of the stack. The compiler knows the position of this variable.

OP_FROMALTSTACK
OP_DUP
OP_2 OP_ROLL
OP_TOALTSTACK

/* Check that Match_Found = FALSE and place the result on the top of the stack
OP_NOT /* Now get a copy of the variables Hash_Counter and NUM_Hashes for part 2 of condition2 (test if Hash_Counter < NUM_Hashes). The compiler knows the position of these variables
OP_FROMALTSTACK
OP_FROMALTSTACK

OP_DUP

OP_3 OP_ROLL

OP_3 OP_ROLL

OP_TOALSTACK

OP_TOALSTACK

OP_ 13 OP_PICK

/* check Hash_Counter < NUM_Hashes

OP_LESSTHAN

/* Completes the condition2 combined check: the results of both parts of the condition2 check are on the top of the stack. After this op the final result is left on the top of the stack.

OP_BOOLAND

/* The result of the Condition2 test is on top of the stack. It is popped off by the following IF.

OP_IF

/* Borrow Block for increment Hash_Counter

/* the depth of the required hash value (i.e. <Hash-depth> ) can be calculated by the compiler as current-stack-height − Hash1-position − Hash_counter + 1

/* The compiler can maintain knowledge of the position of all constants, so knows that the position of the first hash value is 9 (because there are 5 Try values, and three other constants at the bottom of the stack).

/* There is one TEMP value at the top of the main stack, therefore the current stack height is 19. If we want the depth of HASH-SAVED[4] (Hash_counter = 4), then the depth is:

Hash-depth = 19 − 9 − 4 + 1 = 8

(i.e. currently 8 from the top of main stack)

OP_FROMALTSTACK
OP_FROMALTSTACK
OP_ADD1
OP_TOALTSTACK
OP_TOALTSTACK

<Hash-depth> OP_PICK

/* The second-to-top of the stack is the result of the OP_HASH160 operation performed just before the inner loop (TEMP); the following operation checks the hashed Try value (TEMP) against the internally saved hash value

OP_EQUAL

OP_IF
    /* Set Match_Found = True
    OP_FROMALTSTACK
    OP_DROP
    OP_TRUE
    OP_TOALTSTACK /* Increment Correct_counter
    OP_FROMALTSTACK
    OP_FROMALTSTACK OP_FROMALTSTACK
                OP_FROMALTSTACK
                OP_ADD1
                OP_TOALTSTACK
                OP_TOALTSTACK
                OP_TOALTSTACK
                OP_TOALTSTACK
        OP_ENDIF
OP_ENDIF /* END OF Inner WHILE loop.

/* opcodes to retrieve NUM_INPUTS

/* opcodes for check NUM_INPUTS ≥ 1

OP_IF

Replica of the op_code sequence for the second iteration of the Inner WHILE loop

END_IF

/* opcodes for check NUM_INPUTS ≥ 2

OP_IF

Replica of the op_code sequence for the third iteration of the Inner WHILE loop

END_IF

/* opcodes for check NUM_INPUTS ≥ 3

OP_IF

> Replica of the op_code sequence for the fourth iteration of the Inner WHILE loop

END_IF

/* opcodes for check NUM_INPUTS ≥ 4

OP_IF

> Replica of the op_code sequence for the fifth iteration of the Inner WHILE loop

END_IF

/* opcodes for check NUM_INPUTS ≥ 5

OP_IF

> Replica of the op_code sequence for the sixth iteration of the Inner WHILE loop

END_IF

/* opcodes for check NUM_INPUTS ≥ 6

OP_IF

> Replica of the op_code sequence for the seventh iteration of the Inner WHILE loop

END_IF

/* opcodes for check NUM_INPUTS >= 7

OP_IF

> Replica of the op_code sequence for the eighth iteration of the Inner WHILE loop

END_IF

/* opcodes for check NUM_INPUTS >= 8

OP_IF

Replica of the op_code sequence for the ninth iteration of the Inner WHILE loop

END_IF

/* opcodes for check NUM_INPUTS >= 9

OP_IF

Replica of the op_code sequence for the tenth iteration of the Inner WHILE loop

END_IF

**/* END OF Outer WHILE loop.**

Replica of the op_code sequence for the second iteration of the Outer WHILE loop (including the replicas of the op_code sequence for the NUM_INPUTS iterations (up to 10) of the Inner WHILE loop)

Replica of the op_code sequence for the third iteration of the Outer WHILE loop (including the replicas of the op_code sequence for the NUM_INPUTS iterations (up to 10) of the Inner WHILE loop)

Replica of the op_code sequence for the fourth iteration of the Outer WHILE loop (including the replicas of the op_code sequence for the NUM_INPUTS iterations (up to 10) of the Inner WHILE loop)

Replica of the op_code sequence for the fifth iteration of the Outer WHILE loop (including the replicas of the op_code sequence for the NUM_INPUTS iterations (up to 10) of the Inner WHILE loop)

Replica of the op_code sequence for the sixth iteration of the Outer WHILE loop (including the replicas of the op_code sequence for the NUM_INPUTS iterations (up to 10) of the Inner WHILE loop)

Replica of the op_code sequence for the seventh iteration of the Outer WHILE loop (including the replicas of the op_code sequence for the NUM_INPUTS iterations (up to 10) of the Inner WHILE loop)

Replica of the op_code sequence for the eighth iteration of the Outer WHILE loop (including the replicas of the op_code sequence for the NUM_INPUTS iterations (up to 10) of the Inner WHILE loop)

Replica of the op_code sequence for the ninth iteration of the Outer WHILE loop (including the replicas of the op_code sequence for the NUM_INPUTS iterations (up to 10) of the Inner WHILE loop)

Replica of the op_code sequence for the tenth iteration of the Outer WHILE loop (including the replicas of the op_code sequence for the NUM_INPUTS iterations (up to 10) of the Inner WHILE loop)

Replica of the op_code sequence for the eleventh iteration of the Outer WHILE loop (including the replicas of the op_code sequence for the NUM_INPUTS iterations (up to 10) of the Inner WHILE loop)

Replica of the op_code sequence for the twelfth iteration of the Outer WHILE loop (including the replicas of the op_code sequence for the NUM_INPUTS iterations (up to 10) of the Inner WHILE loop)

/* At the completion of the 12 iterations of the Outer WHILE loop the compiler checks that the required number of hits has been attained (i.e., it checks that Correct_counter ≥ Correct_Needed OP_FROMALTSTACK  // Retrieve Correct_counter to top of main stack
OP_FROMALTSTACK
OP_FROMALTSTACK
OP_FROMALTSTACK  // copy Correct_Needed to top of stack
OP_12 OP_PICK
OP_GREATERTHAN // This final operation leaves the result of the test on top of the stack. If TRUE (i.e. if Correct_counter ≥ Correct_Needed) and possibly other checks pass, then the transactions is marked as valid.

In embodiments, the blockchain compiler can be configured to optimise the output script at least once to provide a more efficient or reduced version of the output script. This may involve the use of derivative free optimisation (DFO). DFO is a term known in the art and readily understood by a person skilled in the art. Additionally or alternatively, the step of generating the output script may comprise the use of derivative free optimisation.

In embodiments, the blockchain compiler may be arranged to form part of, and/or operate in conjunction with, a software development kit (SDK). The SDK may comprise an editor, a debugger and other component(s) known to be used with an SDK to facilitate the generation of code-based solutions.

Figure 3:
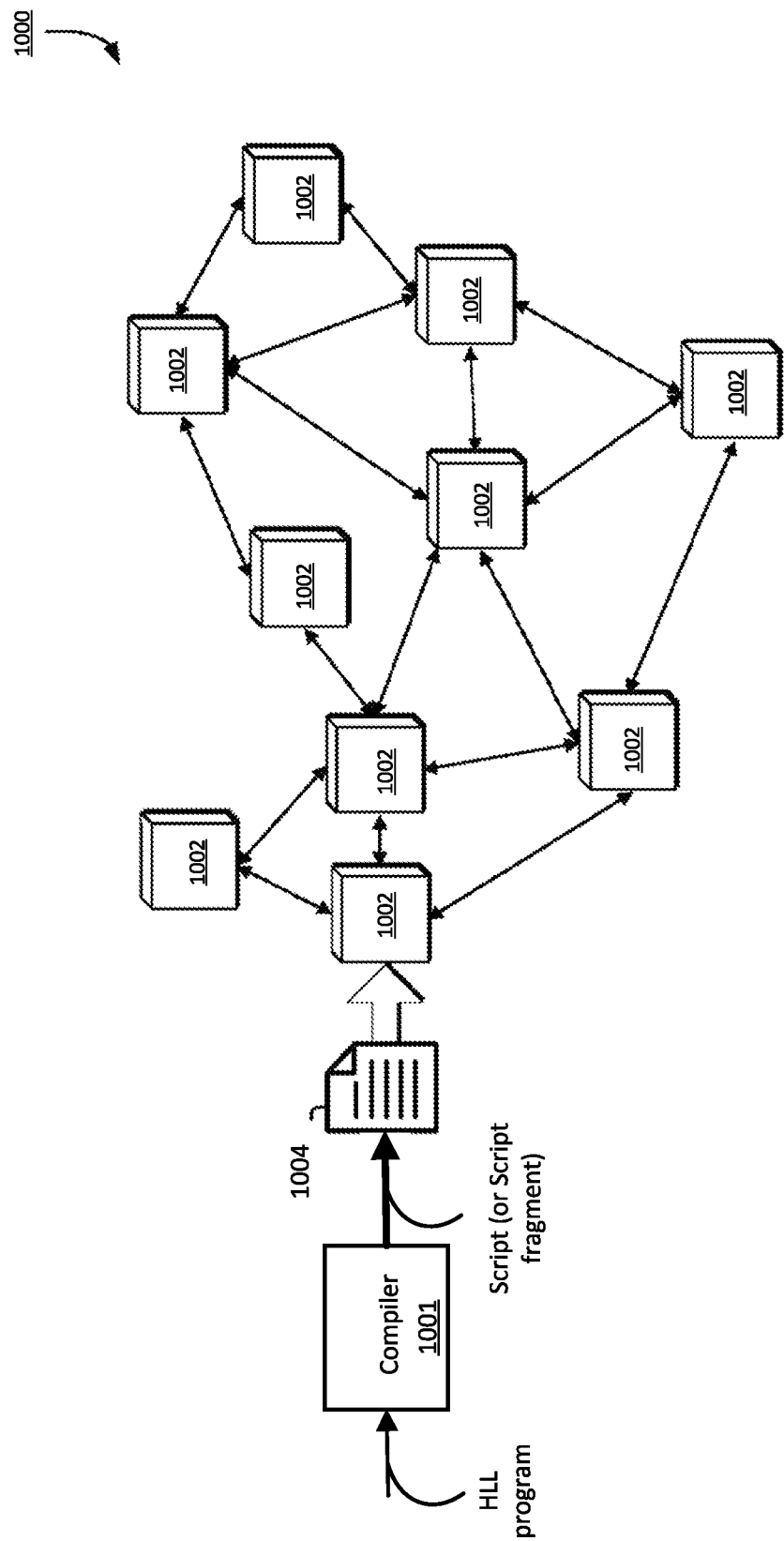
FIG. 3 illustrates a blockchain environment in which various embodiments can be implemented.

FIG. 3 illustrates an example blockchain network 1000 associated with a blockchain in accordance with an embodiment of the present disclosure. In the embodiment, the example blockchain network 1000 is comprised of peer-to-peer distributed electronic devices running an instance of the blockchain protocol. In some examples, the distributed electronic devices are referred to as nodes 1002. An example of a blockchain protocol is a Bitcoin protocol.

Figure 5:
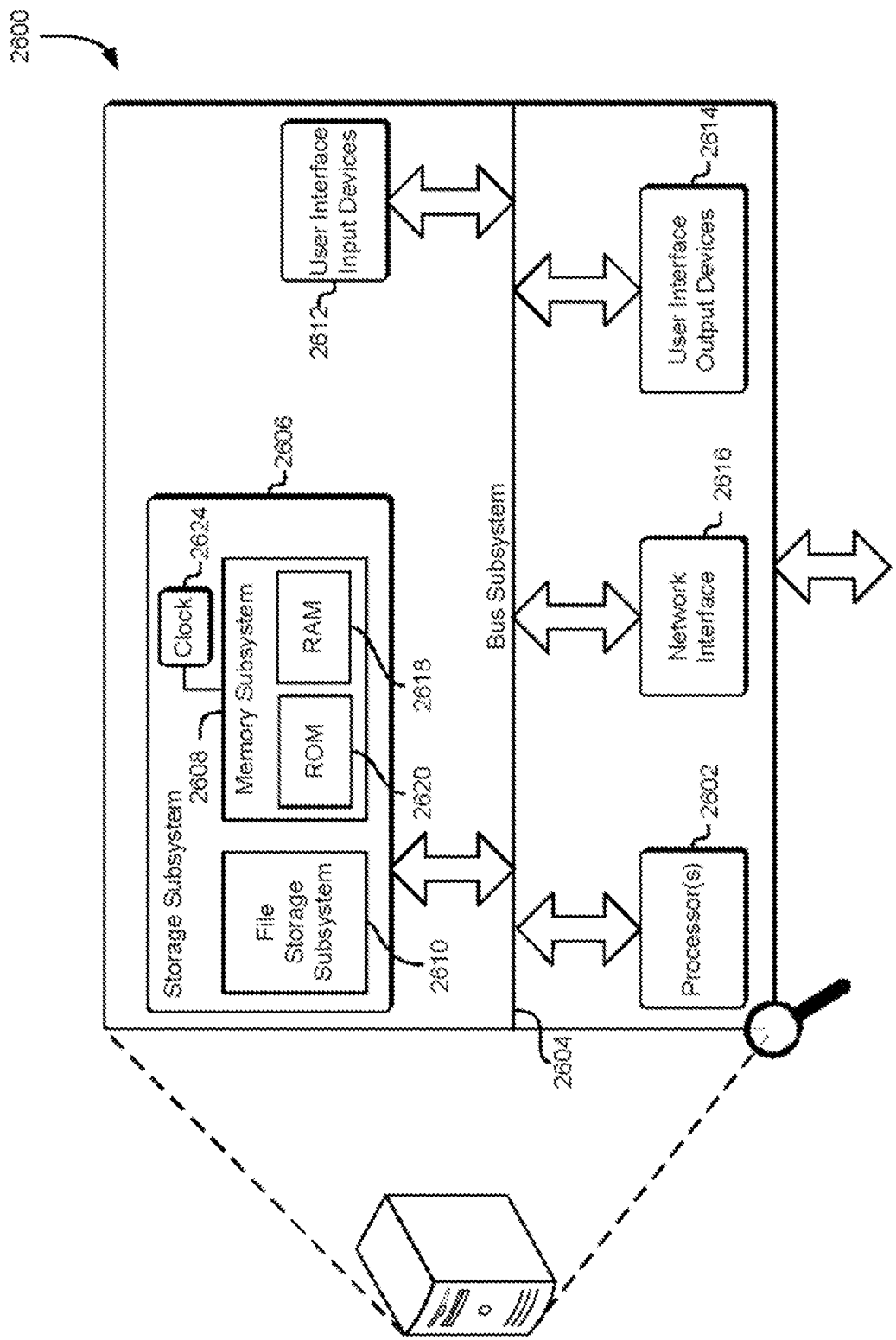
FIG. 5 illustrates a computing environment in which various embodiments can be implemented.

The nodes 1002 may be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 2600 of FIG. 5).

In an embodiment, one or more of the nodes 1002 are communicatively coupled to one or more other of the nodes 1002. Such communicative coupling can employ one or more of wired or wireless communication links as are well known. In the embodiment, the nodes 1002 each maintain at least a portion of a "ledger" of all transactions in the blockchain. In this manner, the ledger is a distributed ledger. A blockchain transaction processed by a node that affects the ledger is validated by one or more of the other nodes such that the integrity of the ledger is maintained.

In an embodiment, at least some of the nodes 1002 are miner nodes that perform a mining process involving complex calculations, such as solving cryptographic problems. A miner node that solves the cryptographic problem creates a new block for the blockchain and broadcasts the new block to others of the nodes 1002. The others of the nodes 1002 perform a verification process that verifies the work of the miner node and, upon verification, accepts the block into the blockchain (e.g., by adding it to the distributed ledger of the blockchain). In some examples, a block is a group of transactions, often marked with a timestamp and a "fingerprint" (e.g., a hash) of the previous block. In this manner, each block becomes linked to a previous block, thereby creating the "chain" that links the blocks in the blockchain. In embodiments, valid blocks are added to the blockchain by a consensus of the nodes 1002. Also, in some examples, a blockchain comprises a list of validated blocks.

In an embodiment, at least some of the nodes 1002 operate as validating nodes that perform a validation process that validates transactions as described in the present disclosure. FIG. 3 shows one exemplary transaction labelled 1004. In some examples, a transaction includes data that provides proof of ownership of a digital asset (e.g., an amount of Bitcoin tokens) and conditions for accepting or transferring ownership/control of the digital asset. In some examples, a "spending transaction" refers to a transaction that re-associates (e.g., transferring ownership or control) at least a portion of a digital asset, indicated by an unspent transaction output (UTXO) of a previous transaction, to an entity associated with a blockchain address. In some examples, a "previous transaction" refers to a transaction that contains the UTXO being referenced by the spending transaction. In some embodiments, the transaction can include an "unlocking script" and a "locking script." The locking script can be used to encumber the transaction with conditions that must be fulfilled before the transaction is validated and ownership/control is transferred by the transaction. In some embodiments, the locking script can be associated with an output of the transaction and can be configured to define one or more conditions needed to spend the output. Furthermore, the unlocking script of the spending transaction can be configured such that execution of the unlocking script provides data that is used to derive a set of conditions evaluated by the execution of the locking script of the previous transaction for validation of the spending transaction. The locking script of the previous transaction and the unlocking script of the spending transaction are written using a low level functionally-restricted scripting language, such as Bitcoin's Script.

In some embodiments, validation of a spending transaction may involve executing the unlocking script of spending transaction together with executing the locking script of the previous transaction in order to satisfy and validate a set of conditions dictated by the locking script of the previous transaction. The validation of the spending transaction can involve other checks. Upon successful validation of the spending transaction, the spending transaction can be propagated to other network nodes. A miner node can select to embed the valid spending transaction as part of a block that is added to the blockchain as described herein.

As shown in FIG. 3, a blockchain compiler 1001 as described herein is used to translate a HLL program into a blockchain compatible script (or script fragment). This may be referred to as an "output script" as it may form the output provided by the blockchain compiler 1001. The output script may be provided in a blockchain transaction (Tx). It may be part of a locking script associated with a transaction output or part of the unlocking script associated with a transaction input. The output script may be formed of op_codes that are selected from, are native to, and/or form part of a blockchain scripting language which can be executed by the nodes of the blockchain network. The op_codes may be referred to as primitives or commands. The op_codes of the script can be executed 105 by an interpreter 104 or virtual machine that runs on the nodes of the blockchain network 1000. The interpreter or virtual machine may translate the op_codes of the script into machine-executable (object) code. The blockchain scripting language may be, for example, the Script language as used in conjunction with the Bitcoin protocol or a variation thereof. The scripting language may comprise cryptographic, arithmetic and stack manipulation op_codes.

The compiler 1001 can be part of an SDK or possibly an online service that employs static compilation to generate blockchain transaction scripts (or script fragments) that can be executed by bots or nodes of the blockchain network.

Alternatively, the methodology of the compiler as described herein can be used as part of the runtime environment of a bot or node of the blockchain network, where the runtime environment interprets or dynamically compiles or translates chunks of HLL programs (e.g., programs written in a 3G language such python, C++, etc.) into blockchain transaction script or script fragments that can be executed by the bot or node of the blockchain network.

Figure 4:
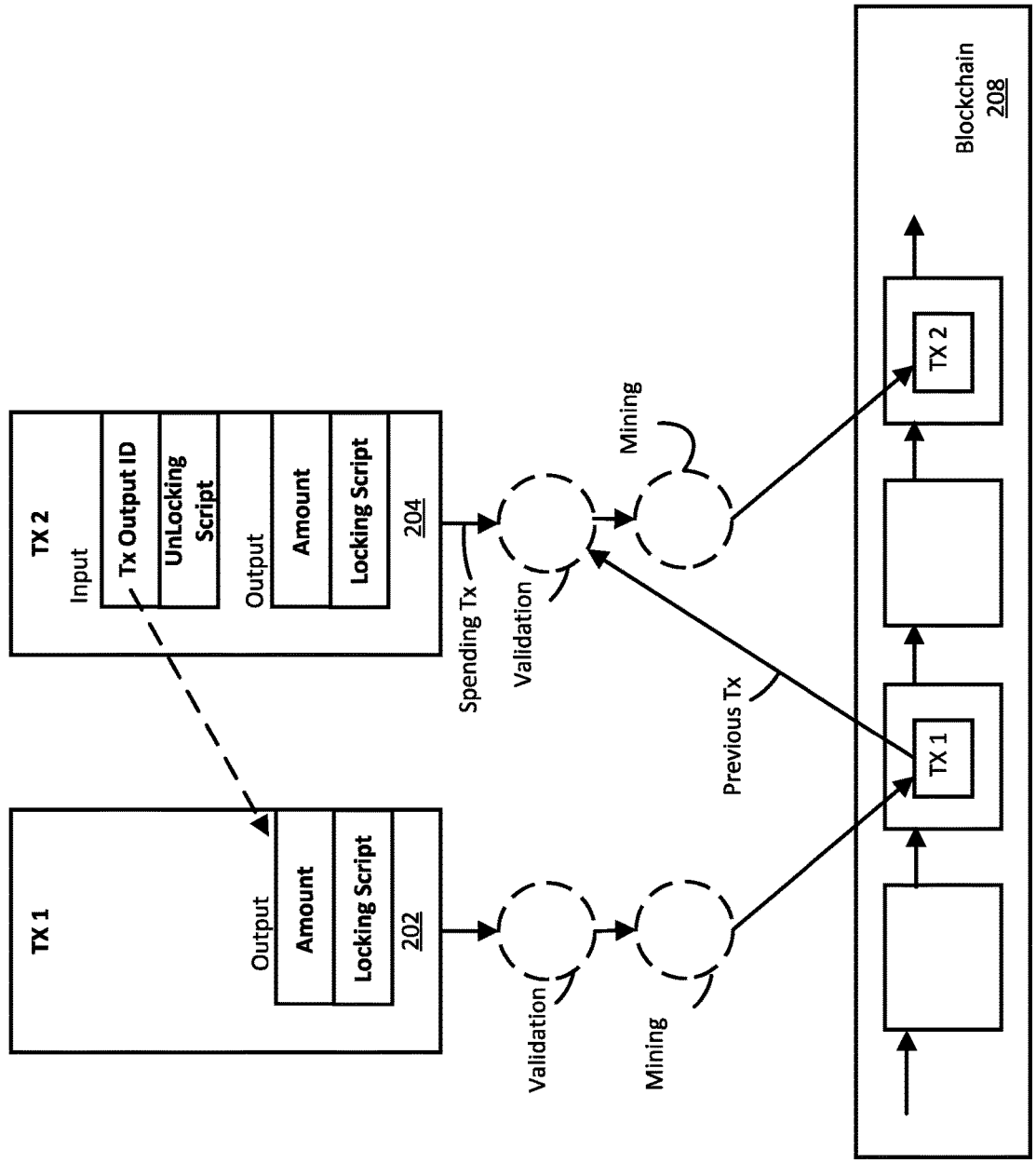
FIG. 4 illustrates a blockchain protocol for validating and mining a spending blockchain transaction that references a previous blockchain transaction in accordance with an embodiment.

FIG. 4 illustrates an exemplary blockchain protocol for validation and mining of a spending transaction 204 (labelled "TX 2") that spends the output of a previous transaction 202 (labelled "TX1"). The previous transaction 202 has an output that includes a token amount (digital asset) and a locking script configured to define a set of conditions needed to spend the token amount. The previous transaction 202 has been validated and mined such that it is embedded in a block and then the block is verified such that it is stored on the blockchain 208. The spending transaction 204 includes an input with transaction output identifier fields (labelled "Tx output ID") that refer to the output of the previous transaction 202 and an unlocking script. The locking script of the previous transaction 202 and the unlocking script of the spending transaction 204 are written using a low level functionally-restricted scripting language, such as Bitcoin's Script. For the spending transaction 204 to be considered valid, the unlocking script of the input must provide data that satisfies the set of conditions defined by the locking script of the referenced output of the previous transaction 202. The locking script of the previous transaction 202 (or part thereof) and the unlocking script of the spending transaction 204 can be generated by the blockchain compilation methods and tools as described herein.

The spending transaction 204 is validated by one or more nodes of the blockchain network (FIG. 4) by executing the unlocking script of spending transaction 204 together with executing the locking script of the previous transaction 202 in order to satisfy and validate a set of conditions dictated by the locking script of the previous transaction 202. The validation of the spending transaction 204 can involve other checks. Upon successful validation of the spending transaction 204, the spending transaction can be propagated to other network nodes. A miner node can perform mining operations that select and embed the valid spending transaction as part of a block that is added to the blockchain 208 as described herein. Once validated and stored on the blockchain 208, the sequence of transactions 202 and 204 provide for transfer of control over the token amount (digital assets) referenced by the transactions.

FIG. 5 is an illustrative, simplified block diagram of a computing device 2600 that may be used to practice at least one embodiment of the present disclosure. In various embodiments, the computing device 2600 may be used to implement the blockchain compiler and network nodes of the blockchain network as illustrated and described above. For example, the computing device 2600 may be configured for use as a data server, a web server, a portable computing device, a personal computer, or any electronic computing device. As shown in FIG. 5, the computing device 2600 may include one or more processors 2602 that may be configured to communicate with, and are operatively coupled to, a number of peripheral subsystems via a bus subsystem 2604. The processors 2602 may be utilized for the compilation of an HLL source code program into a blockchain script (or fragment thereof) as described herein. These peripheral subsystems may include a storage subsystem 2606, comprising a memory subsystem 2608 and a file/disk storage subsystem 2610, one or more user interface input devices 2612, one or more user interface output devices 2614, and a network interface subsystem 2616. Such storage subsystem 2606 may be used for temporary or long-term storage of information, such as details associated with transactions described in the present disclosure.

The bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses. The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a wireless network such that the data technician may be able to transmit and receive data while in a remote location, such as a user data centre. The bus subsystem 2604 may be utilized for communicating data such as details, search terms, and so on to the supervised model of the present disclosure, and may be utilized for communicating the output of the supervised model to the one or more processors 2602 and to merchants and/or creditors via the network interface subsystem 2616.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600. The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. The storage subsystem 2606 may comprise a memory subsystem 2608 and a file/disk storage subsystem 2610.

The memory subsystem 2608 may include a number of memories, including a main random-access memory (RAM) 2618 for storage of instructions and data during program execution and a read only memory (ROM) 2620 in which fixed instructions may be stored. The file/disk storage subsystem 2610 may provide a non-transitory persistent (non-volatile) storage for program and data files and may include a hard disk drive, a floppy disk drive along with associated removable media, a Compact Disk Read Only Memory (CD-ROM) drive, an optical drive, removable media cartridges, and other like storage media.

The computing device 2600 may include at least one local clock 2624. The local clock 2624 may be a counter that represents the number of ticks that have transpired from a particular starting date and may be located integrally within the computing device 2600. The local clock 2624 may be used to synchronize data transfers in the processors for the computing device 2600 and all of the subsystems included therein at specific clock pulses and may be used to coordinate synchronous operations between the computing device 2600 and other systems in a data centre. In one embodiment, the local clock 2624 is an atomic clock. In another embodiment, the local clock is a programmable interval timer.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 13 is intended only as a specific example for purposes of illustrating the preferred embodiment of the device. Many other configurations having more or fewer components than the system depicted in FIG. 5 are possible.

It should be noted that the above-mentioned embodiments illustrate rather than limit the present disclosure, and that those skilled in the art will be capable of designing many alternative embodiments without departing from the scope of the present disclosure as defined by the appended claims. The methods, systems and apparatus of the present disclosure (or parts thereof) may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In the claims, any reference signs placed in parentheses shall not be construed as limiting the claims. Furthermore, the use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The singular reference of an element does not exclude the plural reference of such elements and vice-versa.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A computer-implemented method comprising steps:
   receiving a portion of a source code as input, wherein the portion of the source code is written in a high-level language (HLL) that specifies a functionality; and
   generating an output script comprising a plurality of op codes selected from and/or native to a functionally-restricted blockchain scripting language such that, when executed, the output script provides, at least in part, a functionality specified in the portion of the source code, wherein the functionally-restricted blockchain scripting language does not natively support complex control-flow constructs, recursion, and jump-based loops.

2. The computer-implemented method of claim 1, and further comprising the step of:
   providing or using a compiler arranged to perform the steps of claim 1.

3. The computer-implemented method of claim 2, wherein the compiler forms part of a software development kit (SDK).

4. The computer-implemented method of claim 1, wherein the output script is generated by performing a static compilation.

5. The computer-implemented method of claim 1, wherein the step of generating the output script comprises:
   unrolling at least one looping construct provided in the portion of the source code.

6. The computer-implemented method of claim 1, and further comprising the step of:
   providing or using an interpreter or a virtual machine arranged to convert the output script into a form that is executable on a blockchain platform.

7. The computer-implemented method of claim 1, and further comprising the step of:
   optimising the output script at least once to provide a more efficient or reduced version of the output script.

8. The computer-implemented method of claim 1, wherein the step of generating the output script comprises derivative free optimisation.

9. The computer-implemented method of claim 1, wherein the portion of the source code is arranged to implement a smart contract.

10. The computer-implemented method of claim 1, wherein the HLL comprises at least one primitive or construct which can be translated directly into one or more primitives native to the functionally-restricted blockchain scripting language.

11. The computer-implemented method of claim 1, wherein the functionally-restricted blockchain scripting language is stack-based and the HLL comprises one or more primitives arranged to perform an operation on a stack used by the functionally-restricted blockchain scripting language.

12. The computer-implemented method of claim 1, wherein the HLL comprises a primitive arranged to push a number of inputs to the portion of the source code onto a stack used for memory allocation by the functionally-restricted blockchain scripting language.

13. The computer-implemented method of claim 1, wherein the HLL comprises at least one of the following primitives or operators or a functional equivalent of at least one of the following primitives or operators:
   Initiate;
   Declare;
   Increment;
   IF;
   While;
   Populate;
   Monus;
   Reset;
   Rawscript;
   Abort;
   Retrieve; and
   Hash, hash 160, or another hash operation or a variation thereof.

14. A computer-implemented system comprising one or more processors and a memory that stores computer-executable instructions that, as a result of execution, cause the one or more processors to implement the steps of claim 1.

15. The computer-implemented system of claim 14, further comprising a compiler arranged to:
   receive a portion of the source code as input, the portion of the source code being written in a high-level language (HLL) and specifying a functionality; and
   generate an output script comprising a plurality of op codes selected from a functionally-restricted blockchain scripting language such that, when executed, the output script provides, at least in part, the functionality specified in the portion of the source code, wherein the functionally-restricted blockchain scripting language does not natively support complex control-flow constructs, recursion, and jump-based loops.

16. The computer-implemented system of claim 14, further comprising a software development kit (SDK).

17. A computer-implemented method comprising the step of using static compilation to translate a portion of source code into a blockchain-compatible script, wherein the blockchain-compatible script is functionally-restricted and does not natively support complex control-flow constructs, recursion, and jump-based loops, and wherein the static compilation comprises the step of loop unrolling.

* * * * *